US010383137B2

(12) United States Patent
Gupta et al.

(10) Patent No.: US 10,383,137 B2
(45) Date of Patent: Aug. 13, 2019

(54) MECHANISMS FOR SIGNALING OUT-OF-COVERAGE SIDELINK DEVICES IN WIRELESS COMMUNICATION

(71) Applicant: QUALCOMM Incorporated, San Diego, CA (US)

(72) Inventors: Piyush Gupta, Bridewater, NJ (US); Junyi Li, Chester, NJ (US); Chong Li, Weehawken, NJ (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 15/411,928

(22) Filed: Jan. 20, 2017

(65) Prior Publication Data
US 2018/0035448 A1 Feb. 1, 2018

Related U.S. Application Data

(60) Provisional application No. 62/367,741, filed on Jul. 28, 2016.

(51) Int. Cl.
H04W 72/12 (2009.01)
H04W 76/00 (2018.01)
H04W 76/14 (2018.01)
H04W 72/04 (2009.01)
(Continued)

(52) U.S. Cl.
CPC ... *H04W 72/1263* (2013.01); *H04W 72/0446* (2013.01); *H04W 72/1289* (2013.01); *H04W 72/14* (2013.01); *H04W 76/14* (2018.02); *H04W 84/18* (2013.01)

(58) Field of Classification Search
CPC .............................. H04W 76/14; H04W 76/23
See application file for complete search history.

(56) References Cited

U.S. PATENT DOCUMENTS

2014/0328329 A1 11/2014 Novlan et al.
2015/0215088 A1* 7/2015 Kumar ................. H04W 72/14
370/252
2015/0215903 A1 7/2015 Zhao et al.
(Continued)

FOREIGN PATENT DOCUMENTS

EP 3051911 A1 8/2016
JP WO 2016159000 A1 * 10/2016 ............ H04W 24/10
(Continued)

OTHER PUBLICATIONS

Yasukawa S., et al., "D2D Communications in LTE-Advanced Release 12", NTT DOCOMO Technical Journal, vol. 17, No. 2, 2015, pp. 56-64.
(Continued)

Primary Examiner — Scott M Sciacca
(74) Attorney, Agent, or Firm — Loza & Loza, LLP

(57) ABSTRACT

Aspects of the present disclosure provide methods and apparatuses that can provide sidelink grant information to out-of-coverage (OoC) sidelink devices. When one or more sidelink devices are out of a coverage area of a base station, an in-coverage device receiving sidelink grant information from the base station can retransmit, relay, or rebroadcast sidelink grant information to the OoC sidelink devices to enable sidelink communication with the OoC device or facilitate sidelink communication between OoC devices.

22 Claims, 23 Drawing Sheets

Sidelink-Centric Subframe (Unicast)

(51) Int. Cl.
*H04W 72/14* (2009.01)
*H04W 84/18* (2009.01)

(56) References Cited

U.S. PATENT DOCUMENTS

| | | | |
|---|---|---|---|
| 2015/0271786 A1* | 9/2015 | Xue | H04W 74/0816 |
| | | | 370/329 |
| 2015/0327296 A1* | 11/2015 | Kumar | H04W 72/14 |
| | | | 370/329 |
| 2015/0327315 A1 | 11/2015 | Xue et al. | |
| 2015/0351058 A1* | 12/2015 | Seo | H04W 56/002 |
| | | | 370/350 |
| 2015/0373651 A1* | 12/2015 | Ryu | H04W 52/245 |
| | | | 455/522 |
| 2016/0088618 A1 | 3/2016 | Barriac et al. | |
| 2016/0212721 A1 | 7/2016 | Sheng et al. | |
| 2016/0338095 A1* | 11/2016 | Faurie | H04W 28/0278 |
| 2017/0019812 A1* | 1/2017 | Lee | H04W 76/14 |
| 2017/0245313 A1 | 8/2017 | Kim et al. | |
| 2018/0070217 A1* | 3/2018 | Morita | H04W 76/14 |
| 2018/0084480 A1* | 3/2018 | Yasukawa | H04W 76/14 |

FOREIGN PATENT DOCUMENTS

| | | |
|---|---|---|
| WO | WO-2015046155 A1 | 4/2015 |
| WO | WO-2015143170 A1 | 9/2015 |
| WO | WO-2016028059 A1 | 2/2016 |

OTHER PUBLICATIONS

International Search Report and Written Opinion—PCT/US2017/043548—ISA/EPO—dated Oct. 30, 2017.

\* cited by examiner

Sidelink-Centric Subframe (Unicast)

Sidelink-Centric Subframe (Broadcast)

Orthogonalized Broadcast

In-Band Broadcast

US 10,383,137 B2

MECHANISMS FOR SIGNALING OUT-OF-COVERAGE SIDELINK DEVICES IN WIRELESS COMMUNICATION

PRIORITY CLAIM

This application claims priority to and the benefit of provisional patent application No. 62/367,741, filed in the United States Patent and Trademark Office on Jul. 28, 2016, the entire content of which is incorporated herein by reference as if fully set forth below in its entirety and for all applicable purposes.

TECHNICAL FIELD

The technology discussed herein relates, generally, to wireless communication systems, and, more particularly, to wireless communication using a sidelink-centric subframe. Embodiments can provide and enable techniques for signaling out-of-coverage sidelink devices.

INTRODUCTION

In many existing wireless communication systems, a cellular network is implemented by enabling wireless user equipment to communicate with another by signaling with a nearby base station or cell. As a user equipment moves across the service area, handovers take place such that each user equipment maintains communication with one another via its respective best cell.

Another scheme for a wireless communication system is frequently referred to as a mesh or peer-to-peer (P2P) network, whereby wireless user equipment may signal one another directly, rather than via an intermediary base station or cell.

Somewhat in between these schemes is a system configured for sidelink signaling. With sidelink signaling, a wireless user equipment communicates in a cellular system, generally under the control of a base station. However, the wireless user equipment (UE) is further configured for sidelink signaling directly between user equipment without passing through the base station. However, in some circumstances, UE-to-UE communications may experience problems when one or more of the peer UEs are out of coverage of the base station such that the UE(s) cannot receive control information or grants from the base station.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide methods and apparatuses that can provide sidelink grant information to out-of-coverage (OoC) sidelink devices. When one or more sidelink devices are out of a coverage area of a base station, an in-coverage device receiving sidelink grant information from the base station can retransmit, relay, or rebroadcast sidelink grant information to the OoC sidelink devices to enable sidelink communication with the OoC device or facilitate sidelink communication between OoC devices.

One aspect of the present disclosure provides a method of wireless communication by an apparatus. According to the method, the apparatus receives sidelink grant information from a scheduling entity, and transmits a first sidelink handshake signal in a first transmission time interval (TTI) to one or more first scheduled entities located outside a coverage area of the scheduling entity. The first sidelink handshake signal includes sidelink scheduling information based on the sidelink grant information.

Another aspect of the present disclosure provides a method of wireless communication by an apparatus. According to the method, the apparatus receives at a location outside a coverage area of a scheduling entity, from a first scheduled entity, a first sidelink handshake signal including sidelink scheduling information in a transmission time interval (TTI). The first scheduled entity is located inside the coverage area. According to the method, the apparatus further transmits, in the TTI, a second sidelink handshake signal based on the sidelink scheduling information to a second scheduled entity. The second sidelink handshake signal is configured to indicate a requested duration of time to utilize a sidelink channel. The apparatus further transmits, in the TTI, sidelink data utilizing the sidelink channel established according to the sidelink scheduling information.

Another aspect of the present disclosure provides an apparatus for wireless communication. The apparatus includes a communication interface, a memory stored with executable code, and a processor operatively coupled with the communication interface and memory. The processor is configured by the executable code to receive sidelink grant information from a scheduling entity and transmit a first sidelink handshake signal in a first transmission time interval (TTI) to one or more first scheduled entities located outside a coverage area of the scheduling entity. The first sidelink handshake signal includes sidelink scheduling information based on the sidelink grant information.

Another aspect of the present disclosure provides an apparatus for wireless communication. The apparatus includes a communication interface, a memory stored with executable code, and a processor operatively coupled with the communication interface and memory. The processor is configured by the executable code to receive at a location outside a coverage area of a scheduling entity, from a first scheduled entity, a first sidelink handshake signal including sidelink scheduling information in a transmission time interval (TTI). The first scheduled entity is located inside the coverage area. The processor is further configured to transmit, in the TTI, a second sidelink handshake signal based on the sidelink scheduling information to a second scheduled entity. The second sidelink handshake signal is configured to indicate a requested duration of time to utilize a sidelink channel. The processor is further configured to transmit, in the TTI, sidelink data utilizing the sidelink channel established according to the sidelink scheduling information.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Aspects of the present disclosure provide methods and apparatuses that can provide sidelink grant information to out-of-coverage (OoC) sidelink devices. When one or more sidelink devices are out of a coverage area of a base station, an in-coverage device receiving sidelink grant information from the base station can retransmit, relay, or rebroadcast sidelink grant information to the OoC sidelink devices to enable sidelink communication with the OoC device.

Figure 1:
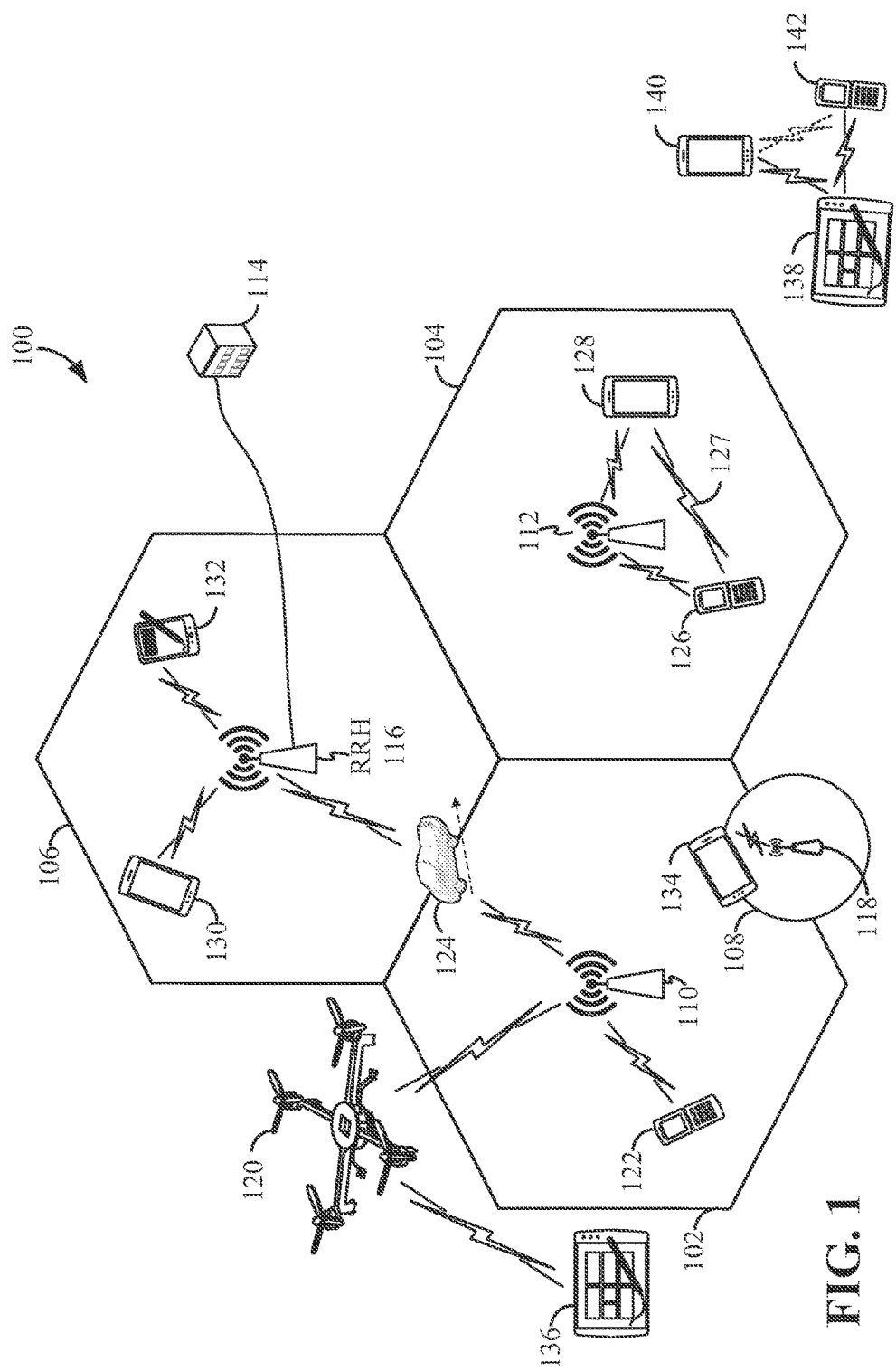
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a consumer and/or wearable device, such as eyewear, a wearable camera, a smart watch, a health or fitness tracker, a digital audio player (e.g., MP3 player), a camera, a game console, etc. An IoT device may additionally be a digital home or smart home device such as a home audio, video, and/or multimedia device, an appliance, a sensor, a vending machine, intelligent lighting, a home security system, a smart meter, etc. A mobile apparatus may additionally be a smart energy or security device, a solar panel or solar array, municipal lighting, water, or other infrastructure; industrial automation and enterprise device, etc. Still further, a mobile apparatus may provide for telemedicine support, or health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UEs (e.g., UEs 126 and 128) may communicate with each other using peer to peer (P2P) or sidelink signals 127 without relaying that communication through a base station (e.g., base station 112).

Unicast or broadcast transmissions of control information and/or data from a base station (e.g., base station 110) to one or more UEs (e.g., UEs 122 and 124) may be referred to as downlink (DL) transmission, while transmissions of control information and/or data originating at a UE (e.g., UE 122) may be referred to as uplink (UL) transmissions. In addition, the uplink and/or downlink control information and/or data may be transmitted in transmission time intervals (TTIs). As used herein, the term TTI may refer to a time interval that includes a schedulable set of data (e.g., including one or more transport blocks). In accordance with various aspects of the present disclosure, a subframe may include one or more TTIs. Thus, as further used herein, the term subframe refers to an encapsulated set of information including one or more TTIs, which is capable of being independently decoded. Multiple subframes may be grouped together to form a single frame. Any suitable number of subframes may occupy a frame. In addition, a subframe may have any suitable duration (e.g., 250 µs, 500 µs, 1 ms, etc.).

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), or other suitable multiple-access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In various aspects of the disclosure, an access network 100 may utilize DL-based mobility or UL-based mobility to enable mobility and handovers from one cell to another. In a network configured for DL-based mobility, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals may be utilized by the network to select a serving cell for a UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
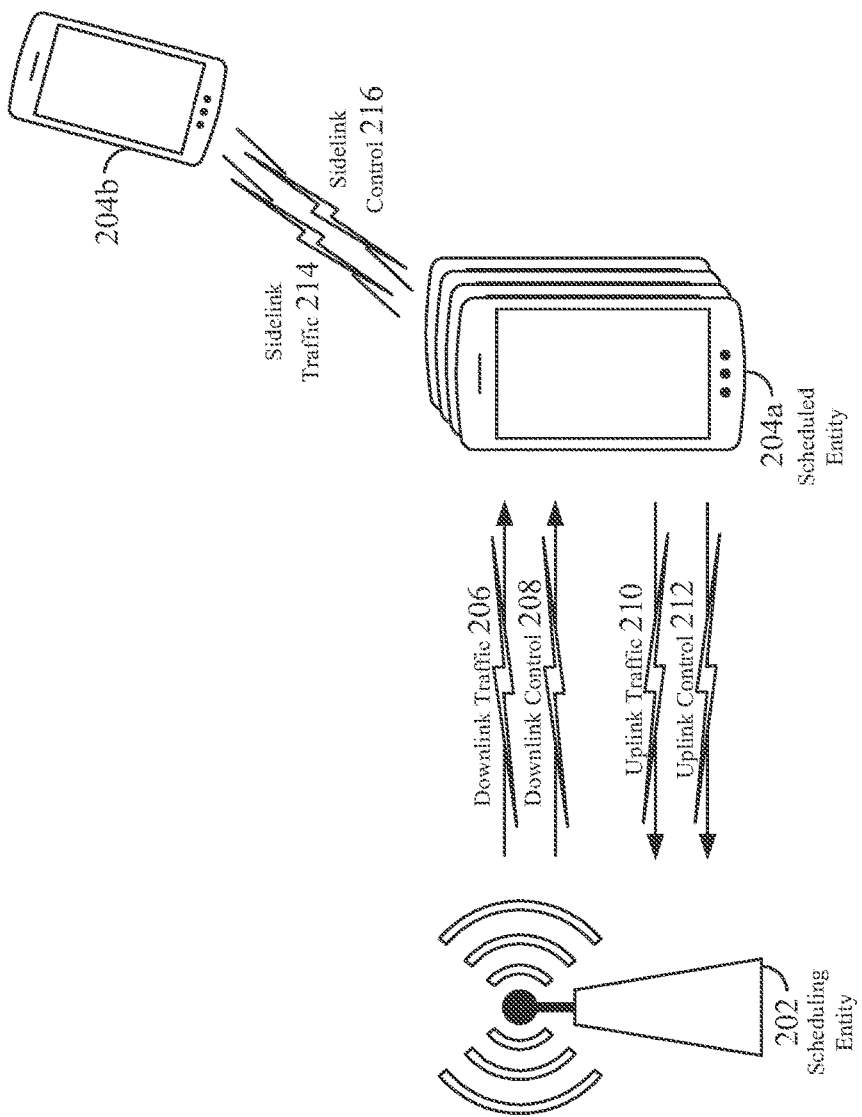
FIG. 2 is a diagram conceptually illustrating an example of a scheduling entity communicating with one or more scheduled entities according to some aspects of the present disclosure.

Thus, in a wireless communication network with a scheduled access to time—frequency resources and having a cellular configuration, a P2P configuration, and a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more scheduled entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink data (traffic) 210 and/or downlink data (traffic) 206 including one or more data channels, such as a physical downlink shared channel (PDSCH) or a physical uplink shared channel (PUSCH) (and, in some examples, system information blocks (SIBs)), may be additionally transmitted between the scheduling entity 202 and the scheduled entity 204. Transmissions of the control and data information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

In some examples, scheduled entities such as a first scheduled entity 204a and a second scheduled entity 204b may utilize sidelink signals for direct D2D communication. Sidelink signals may include sidelink data 214 and sidelink control 216. Sidelink control information 216 may include a source transmit signal (STS), a direction selection signal (DSS), a destination receive signal (DRS), and a physical sidelink HARQ indicator channel (PSHICH). The DSS/STS may provide for a scheduled entity 204 to request a duration of time to keep a sidelink channel available for a sidelink signal; and the DRS may provide for the scheduled entity 204 to indicate availability of the sidelink channel, e.g., for a requested duration of time. An exchange of DSS/STS and DRS signals (e.g., handshake) may enable different scheduled entities performing sidelink communications to negotiate the availability of the sidelink channel prior to communication of the sidelink data information (traffic) 214. The PSHICH may include HARQ acknowledgment information and/or a HARQ indicator from a destination device, so that the destination may acknowledge data received from a source device.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other data, control, and feedback channels.

Figure 3:
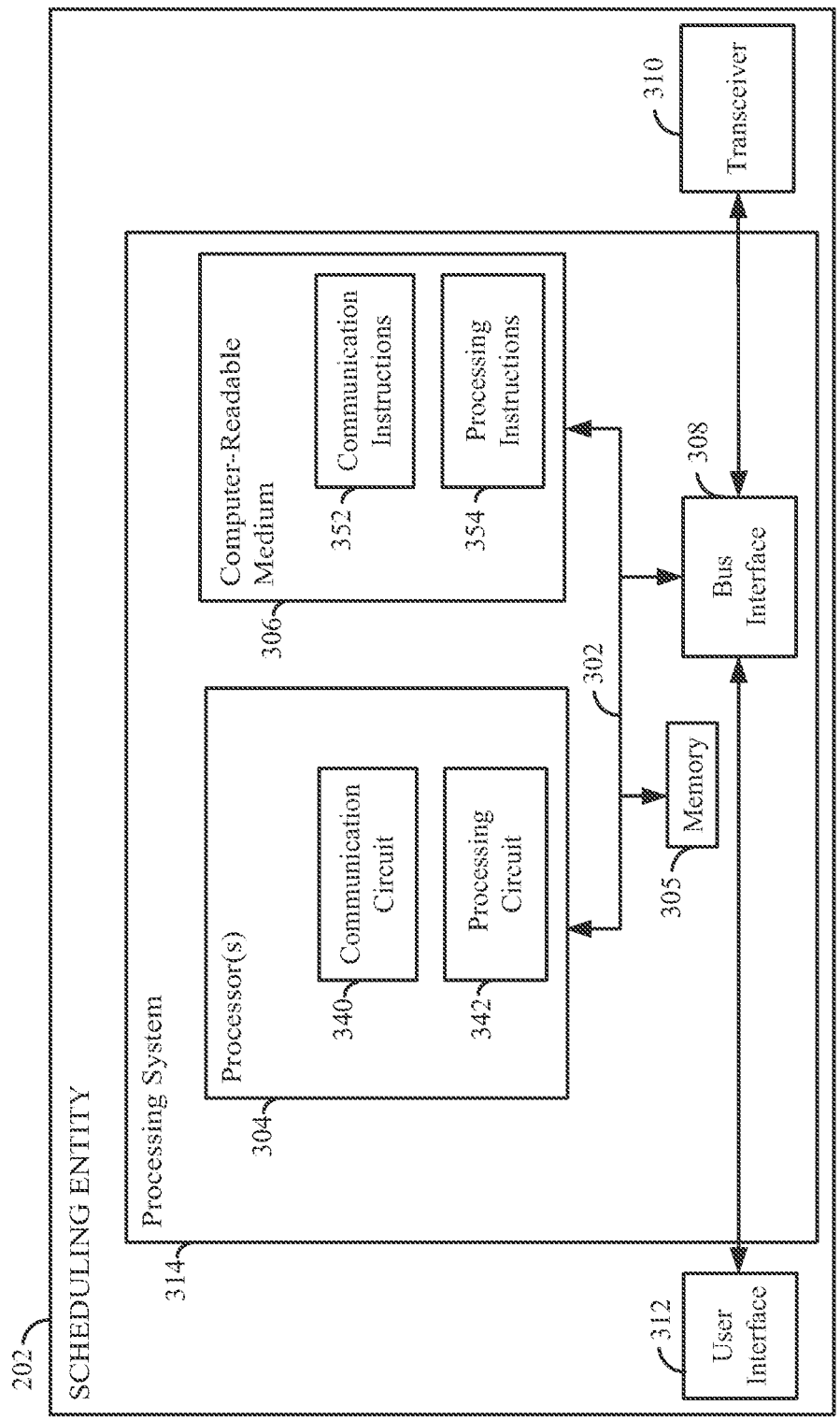
FIG. 3 is a diagram illustrating an example of a hardware implementation for a scheduling entity according to some aspects of the present disclosure.

FIG. 3 is a diagram 300 illustrating an example of a hardware implementation for a scheduling entity 202 according to aspects of the present disclosure. The scheduling entity 202 may employ a processing system 314. For example, the scheduling entity 202 may be a user equipment (UE) as illustrated in any one or more of FIGS. 1, 2, 14-16, 18, 19, and/or 21. In another example, the scheduling entity 202 may be a base station as illustrated in FIGS. 1, 2, 14-16, 18, 19, and/or 21.

The scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 304, as utilized in scheduling entity 202, may be used to implement any one or more of the processes described herein, for example, in FIGS. 14-23.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a communication interface or a means for communicating with various other apparatus over a transmission medium. The transceiver 310 may be configured to perform sidelink communication as described in FIGS. 14-23. Depending upon the nature of the apparatus, a user interface 312 (e.g., keypad, display, speaker, microphone, joystick) may also be provided.

In some aspects of the disclosure, the processor 304 may include a communication circuit 340. The communication circuit 340 may include one or more hardware components that provide the physical structure that performs various processes related to wireless communication (e.g., signal reception and/or signal transmission), in particularly sidelink communication, as described herein. In some aspects of the disclosure, the processor 304 may also include a processing circuit 342. The processing circuit 342 may include one or more hardware components that provide the physical structure that performs various processes related to signal processing (e.g., processing a received signal and/or processing a signal for transmission) as described herein, for example in relation to FIGS. 14-23. The circuitry included in the processor 304 is provided as non-limiting examples. Other means for carrying out the described functions exists and is included within various aspects of the present disclosure.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

The processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium may include, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically-erasable PROM (EEPROM), a register, a removable disk, and any other suitable medium for storing software and/or instructions that may be accessed and read by a computer. A computer-readable medium may also include a transitory computer-readable medium, for example, a carrier wave, a transmission line, or any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable medium 306 may include communication instructions 352. The communication instructions 352 may include instructions for performing various operations related to wireless communication (e.g., signal reception and/or signal transmission) as described herein, for example sidelink communication in relation to FIGS. 14-23. In some aspects of the disclosure, the computer-readable medium 306 may include processing instructions 354. The processing instructions 354 may include instructions for performing various operations related to signal processing (e.g., processing a received signal and/or processing a signal for transmission) as described herein, for example sidelink communication in relation to FIGS. 14-23. The instructions included in the computer-readable medium 306 are provided as non-limiting examples. Other instructions configured to carry out the described functions exist and are included within various aspects of the present disclosure.

Figure 4:
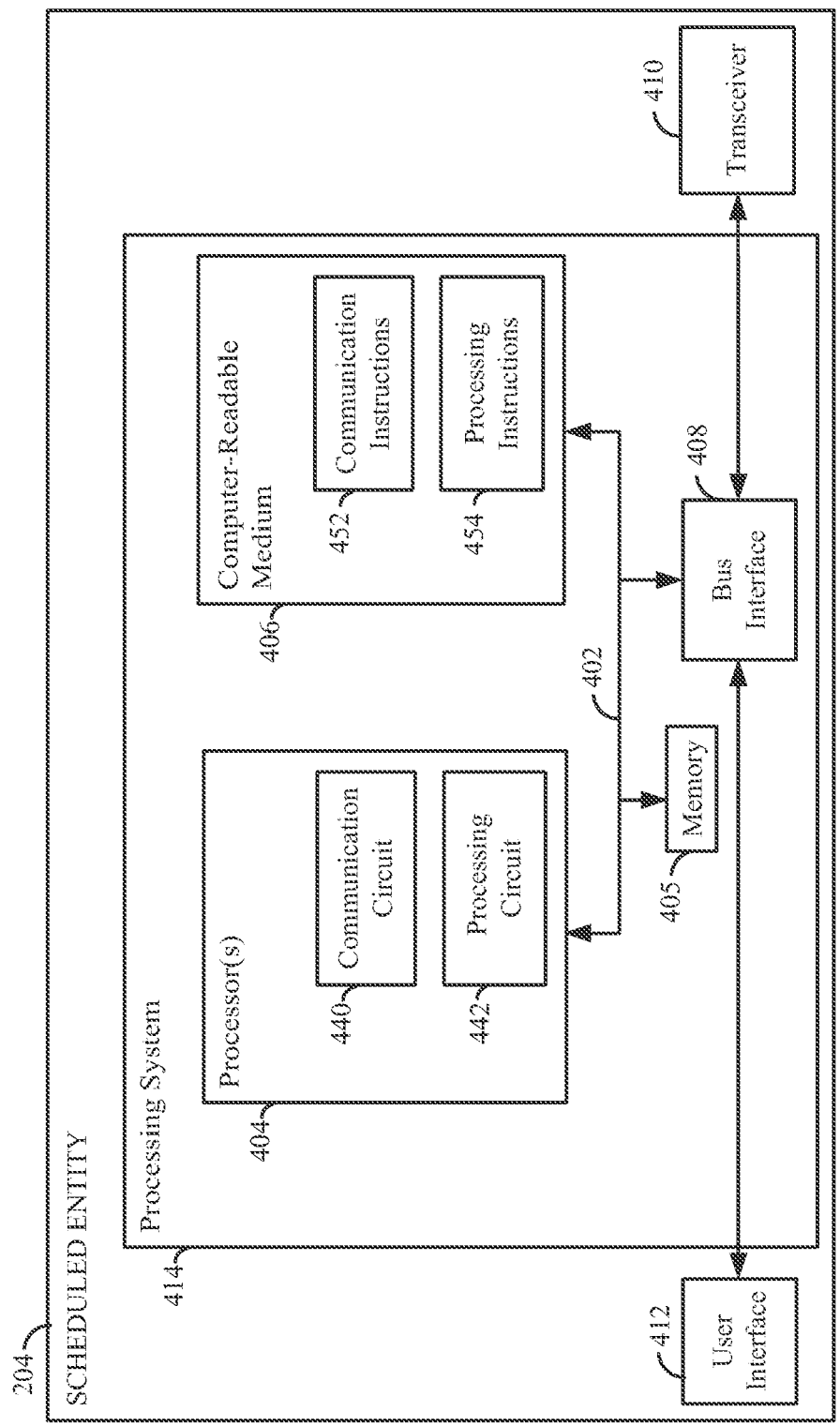
FIG. 4 is a diagram illustrating an example of a hardware implementation for a scheduled entity according to some aspects of the present disclosure.

FIG. 4 is a block diagram illustrating an example of a hardware implementation for an exemplary scheduled entity 204 according to aspects of the present disclosure. The scheduled entity 204 may employ a processing system 414. The scheduled entity 204 may be implemented with a processing system 414 that includes one or more processors 404. For example, the scheduled entity 204 may be a user equipment (UE) as illustrated in any one or more of FIGS. 1, 2, 14-16, 18, 19, and/or 21.

Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, scheduled entity 204 may be configured to perform any one or more of the functions described herein. That is, the processor 404, as utilized in scheduled entity 204, may be used to implement any one or more of the processes described herein.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a communication interface or a means for communicating with various other apparatus over a transmission medium. Depending upon the nature of the apparatus, a user interface 412 (e.g., keypad, display, speaker, microphone, joystick) may also be provided.

In some aspects of the disclosure, at least one processor 404 may include a communication circuit 440. The communication circuit 440 may include one or more hardware components that provide the physical structure that performs various processes related to wireless communication (e.g., sidelink signal reception and/or signal transmission) as described herein for example sidelink communication in relation to FIGS. 14-23. In some aspects of the disclosure, the processor 404 may also include a processing circuit 442. The processing circuit 442 may include one or more hardware components that provide the physical structure that performs various processes related to signal processing (e.g., processing a received sidelink signal and/or processing a sidelink signal for transmission) as described herein, for example sidelink communication in relation to FIGS. 14-23. The circuitry included in the processor 404 is provided as non-limiting examples. Other means for carrying out the described functions exists and is included within various aspects of the present disclosure. In some aspects of the disclosure, the computer-readable medium 406 may store computer-executable code comprising instructions configured to perform various processes described herein. The instructions included in the computer-readable medium 406 are provided as non-limiting examples. Other instructions configured to carry out the described functions exist and are included within various aspects of the present disclosure.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

The processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable medium 406 may include communication instructions 452. The communication instructions 452 may include instructions for performing various operations related to wireless communication (e.g., sidelink signal reception and/or signal transmission) as described herein, for example sidelink communication in relation to FIGS. 14-23. In some aspects of the disclosure, the computer-readable medium 406 may include processing instructions 454. The processing instructions 454 may include instructions for performing various operations related to signal processing (e.g., processing a received sidelink signal and/or processing a sidelink signal for transmission) as described herein, for example sidelink communication in relation to FIGS. 14-23. The instructions included in the computer-readable medium 406 are provided as non-limiting examples. Other instructions configured to carry out the described functions exist and are included within various aspects of the present disclosure.

Figure 5:
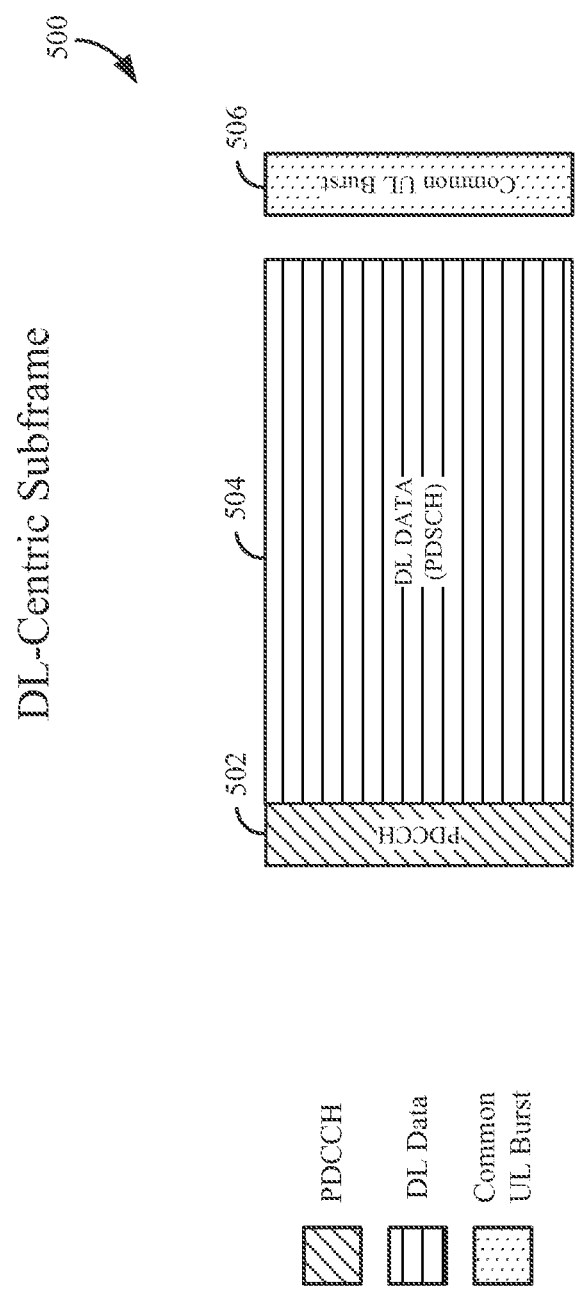
FIG. 5 is a diagram illustrating an example of a downlink (DL)-centric subframe according to some aspects of the present disclosure.

FIG. 5 is a diagram showing an example of a DL-centric subframe 500. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. Additional description related to the PDCCH is provided further below with reference to various other figures. The DL-centric subframe may also include a DL data portion 504. The DL data portion 504 may sometimes be referred to as the payload of the DL-centric subframe. The DL data portion 504 may include the communication resources utilized to communicate DL data from the scheduling entity 202 (e.g., eNB) to the scheduled entity 204 (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information. As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric subframe and alternative structures having similar features may exist without necessarily deviating from the aspects described herein.

Figure 6:
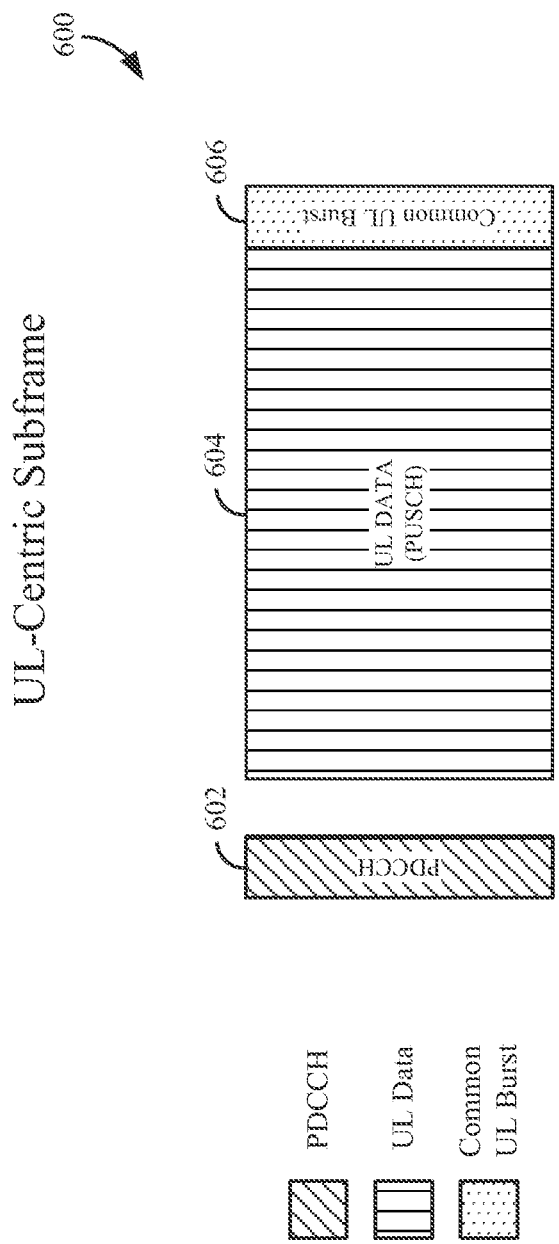
FIG. 6 is a diagram illustrating an example of an uplink (UL)-centric subframe according to some aspects of the present disclosure.

FIG. 6 is a diagram showing an example of an UL-centric subframe 600. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the payload of the UL-centric subframe. The UL portion may refer to the communication resources utilized to communicate UL data from the scheduled entity 204 (e.g., UE) to the scheduling entity 202 (e.g., eNB). In some configurations, the control portion 602 may be a physical UL shared channel (PUSCH). As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)). The UL-centric subframe may also include a common UL portion 606. The common UL portion 606 in FIG. 6 may be similar to the common UL portion 506 described above with reference to FIG. 5. The common UL portion 606 may include additional or alternative information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more scheduled entities 204 (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one scheduled entity 204 (e.g., $UE_1$) to another scheduled entity 204 (e.g., $UE_2$) without relaying that communication through the scheduling entity 202 (e.g., eNB), even though the scheduling entity 202 (e.g., eNB) may be utilized for scheduling and/or control purposes. In some examples, the sidelink signals may be communicated using a licensed spectrum (unlike wireless local area networks, which typically use an unlicensed spectrum).

Figure 7:
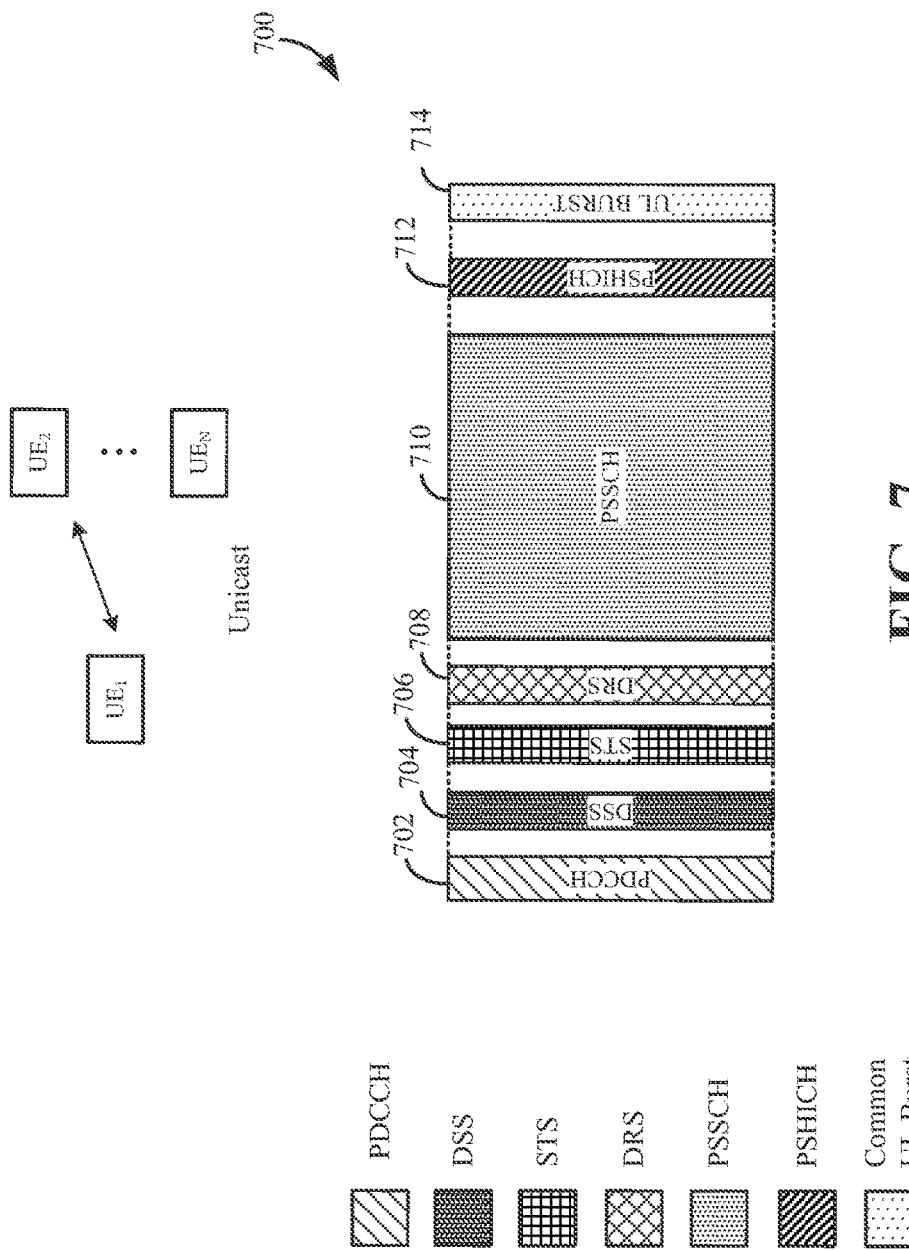
FIG. 7 is a diagram illustrating an example of a unicast sidelink-centric subframe according to some aspects of the present disclosure.

FIG. 7 is a diagram illustrating an example of a sidelink-centric subframe 700 according to some aspects of the present disclosure. In some configurations, this sidelink-centric subframe may be utilized for a unicast communication. A unicast communication may refer to a point-to-point transmission by a scheduled entity 204 (e.g., $UE_1$) to a particular scheduled entity 204 (e.g., $UE_2$).

In this example, the sidelink-centric subframe includes a control portion 702, which may be a physical downlink control channel (PDCCH). In some aspects, the control portion 702 may be a common DL portion configured the same as or similar to the control portion 502 (e.g., PDCCH) described in greater detail above with reference to FIG. 5. Additionally or alternatively, the control portion 702 may include grant information related to the sidelink signal or sidelink communication. Non-limiting examples of grant information (e.g., sidelink grant) may include generic grant information and link-specific grant information. Link-specific grant information may refer to information that enables a specific sidelink communication to occur between two particular scheduled entities 204 (e.g., UEs). In comparison, generic grant information may refer to information that generally enables sidelink communications to occur within a particular cell, without specifying a particular sidelink communication.

Notably, as illustrated in FIG. 7, the control portion 702 may be included in the beginning or initial portion of the sidelink-centric subframe 700. By including the control portion 702 in the beginning or initial portion of the sidelink-centric subframe 700, the likelihood of interfering with the control portions 502, 602 of DL-centric and UL-centric subframes of nominal traffic may be reduced or minimized. In other words, because the DL-centric subframe 500, the UL-centric subframe 600, and the sidelink-centric subframe 700 have their DL control information communicated during a common portion of their respective subframes, the likelihood of interference between the DL control information and the sidelink signals may be minimized. That is, the control portions 502, 602 of DL-centric and UL-centric subframes (of nominal traffic) are relatively better protected.

The sidelink-centric subframe 700 may further include a direction selection signal (DSS) 704, and a source transmit signal (STS) 706. The content of the DSS 704 and the STS 706 may be substantially similar, although the DSS 704 may be utilized by a primary sidelink device and the STS 706 may be utilized by a secondary sidelink device. The DSS and/or STS may be utilized by a scheduled entity 204 (e.g., UE) to indicate a requested duration of time to keep a sidelink channel available for a sidelink signal or traffic. One of ordinary skill in the art will understand that the DSS and/or STS may include various additional or alternative information without necessarily deviating from the scope of the present disclosure. In some configurations, the DSS and/or STS may include a destination identifier (ID). The destination ID may correspond to a specific apparatus intended to receive the DSS/STS (e.g., $UE_1$ or $UE_2$). In some configurations, the DSS and/or STS may indicate a duration of the sidelink transmission, and/or may include a reference signal to enable channel estimation and RX-yielding (described below), a modulation and coding scheme (MCS) indicator, and/or various other information. Here, the MCS indicator may be utilized to inform the receiving device of the MCS utilized for transmissions in the data portion 710.

A primary device may transmit a DSS during the DSS portion 704, and a non-primary device (e.g., a secondary device) may transmit an STS during the STS portion 706. A primary device may refer to a device (e.g., a UE or scheduled entity 204) that has priority access to the sidelink channel. During an association phase, one device may be selected as the primary device and another device may be selected as the non-primary (e.g., secondary) device. In some configurations, the primary device may be a relay device that relays a signal from a non-relay device to another device, such as a scheduling entity 202 (e.g., base station). The relay device may experience relatively less path loss (when communicating with the scheduling entity 202 (e.g., base station)) relative to the path loss experienced by the non-relay device.

During the DSS portion 704, the primary device transmits a DSS, and the non-primary device listens for the DSS from a primary device. On the one hand, if the non-primary device detects a DSS during the DSS portion 704, then the non-primary device will not transmit an STS during STS 706. On the other hand, if the non-primary device does not detect a DSS during the DSS portion 704, then the non-primary device may transmit an STS during the STS portion 706. A time gap (e.g., guard interval, etc.) between DSS 704 and STS 706, if any, may enable the non-primary device to transition from a listening/receiving state (during DSS 704) to a transmitting state (during STS 706).

If the sidelink channel is available for the requested duration of time, an apparatus identified or addressed by the destination ID in the STS/DSS, which receives the STS/DSS, may communicate a destination receive signal (DRS) during the DRS portion 708. The DRS may indicate availability of the sidelink channel for the requested duration of time. The DRS may additionally or alternatively include other information, such as a source ID, a duration of the transmission, a signal to interference plus noise ratio (SINR) (e.g., of the received RS from the source device), an RS to enable TX-yielding, CQI information, and/or various other suitable types of information. The exchange of DSS/STS and DRS enable the scheduled entities 204 (e.g., UEs) performing the sidelink communications to negotiate the availability of the sidelink channel prior to the communication of the sidelink signal, thereby reducing the likelihood of interfering sidelink signals. In other words, without the DSS/STS and DRS, two or more scheduled entities 204 (e.g., UEs) might concurrently transmit sidelink signals using the same resources of the sidelink data portion 710, thereby causing a collision and resulting in undesirable retransmissions.

The sidelink-centric subframe may also include a sidelink data portion 710. The sidelink data portion 710 may sometimes be referred to as the payload or sidelink-burst of the sidelink-centric subframe. In an example where the sidelink-centric subframe is utilized for unicast transmissions, the sidelink data portion 710 may carry a physical sidelink shared channel (PSSCH). The sidelink data portion 710 may include the communication resources utilized to communicate sidelink data from one scheduled entity 204 (e.g., $UE_1$) to a second scheduled entity 204 (e.g., $UE_2$). In some configurations, the MCS of the sidelink signal communicated in the sidelink data portion 710 may be selected based on the CQI feedback included in the DRS 708.

The sidelink-centric subframe may also include a sidelink acknowledgment portion 712. In some aspects of the disclosure, the sidelink acknowledgment portion 712 may carry a physical sidelink HARQ indicator channel (PSHICH). After communicating the sidelink signal in the sidelink data portion 710, acknowledgement information may be communicated between the scheduled entities 204 (e.g., UEs) utilizing the sidelink acknowledgment portion 712. Non-limiting examples of such acknowledgement information may include an ACK signal, a NACK signal, a HARQ indicator, and/or various other suitable types of acknowledgement information. For example, after receiving and successfully decoding a sidelink signal from $UE_1$ in the sidelink data portion 710, $UE_2$ may transmit an ACK signal to the $UE_1$ in the sidelink acknowledgement portion 712 of the sidelink-centric subframe.

The sidelink-centric subframe may also include an UL portion 714. A time gap (e.g., guard interval, etc.) between the sidelink acknowledgment portion 712 and UL portion 714 may enable the device to transition from a listening/receiving state to a transmitting state. In some aspects, the UL portion 714 may be a common UL burst or common UL portion, and may be configured the same as or similar to the common UL portion 506, 606 described above with reference to FIGS. 5-6. Notably, as illustrated in the example of FIG. 7, the common UL portion 714 may be included in the end portion of the sidelink-centric subframe. By including the common UL portion 714 in the end portion of the sidelink-centric subframe, the likelihood of interfering with the common UL portion 506, 606 of DL-centric and UL-centric subframes of nominal traffic is minimized. In other words, because the DL-centric subframe, the UL-centric subframe, and the sidelink-centric subframe have their common UL portion 506, 606, 714 communicated during the same or similar portion of their respective subframe, the likelihood of interference between those common UL portions 506, 606, 714 is reduced. That is, the common UL portions 506, 606 of DL-centric and UL-centric subframes (of nominal traffic) are relatively better protected.

Figure 8:
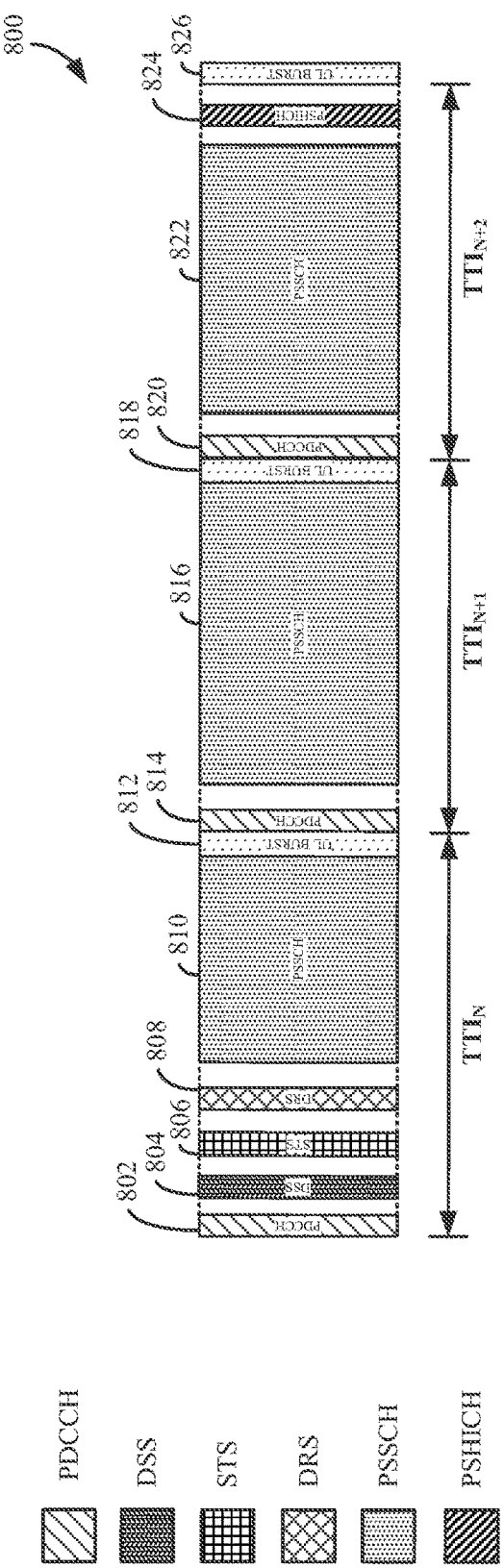
FIG. 8 is a diagram illustrating an example of a sidelink-centric subframe that includes a plurality of transmission time intervals (TTIs) according to some aspects of the present disclosure.
Figure 9:
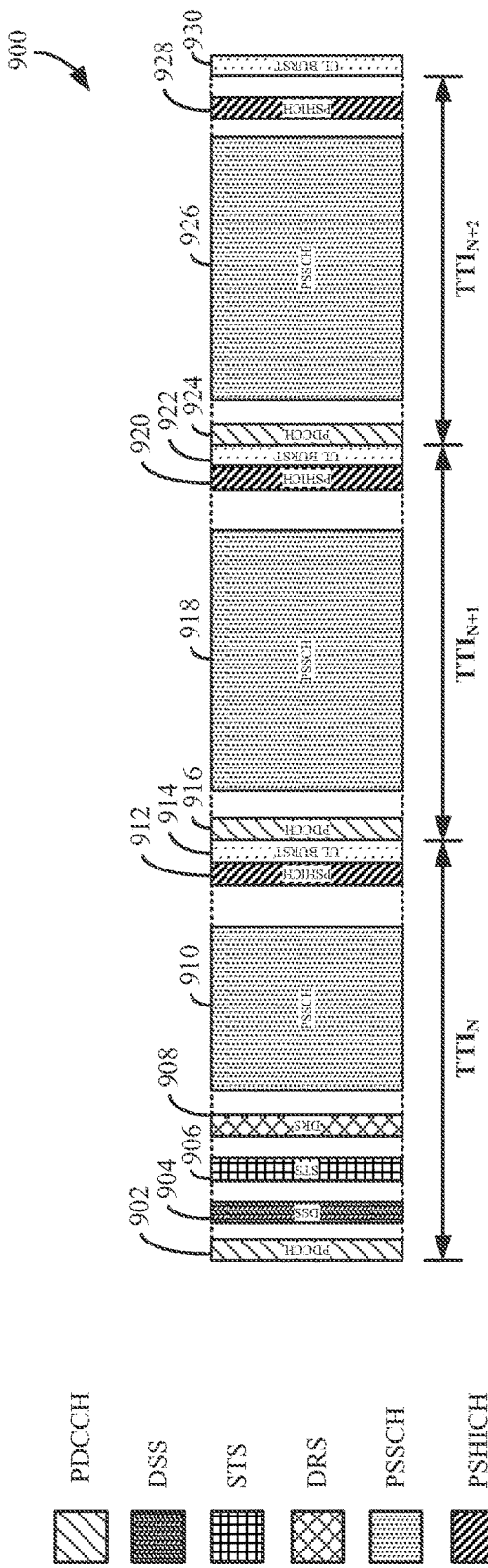
FIG. 9 is a diagram illustrating another example of a sidelink-centric subframe that includes a plurality of TTIs according to some aspects of the present disclosure.

FIGS. 8-9, described below, illustrate multi-TTI subframes according to some aspects of the disclosure. As with the example described above in relation to FIG. 7, in some configurations, the sidelink-centric subframe 800 in FIG. 8 may be utilized for unicast communication. Although the example illustrated in FIG. 8 shows three TTIs (e.g., $TTI_N$, $TTI_{N+1}$, $TTI_{N+2}$), one of ordinary skill in the art will understand that any plural number of TTIs may be implemented within a sidelink-centric subframe as described herein without deviating from the scope of the present disclosure.

The examples described below in FIGS. 8-9 will be described as a single sidelink-centric subframe including a plurality of TTIs. However, it is to be understood that the definition of subframe within the present disclosure is intended to be broad, and not limiting as to the duration of the sidelink-centric subframe 800 or 900. That is, in some technologies, a subframe may always have a duration of a single TTI. Those of ordinary skill in the art will recognize that this only presents a difference in terminology, and aspects of the present disclosure may apply therein. For example, referring to either FIG. 8 or FIG. 9, it may alternatively be understood that the first TTI (e.g., $TTI_N$) corresponds to a first subframe, and each of the following TTIs (e.g., $TTI_{N+1}$-$TTI_{N+2}$) correspond to subsequent subframes. In this example, the DSS/STS—DRS handshake within the first TTI (e.g., $TTI_N$) or first subframe may reserve the sidelink channel over a plurality of subframes or TTIs in the same way as described below.

Referring now specifically to FIG. 8, a diagram illustrates an example of a sidelink-centric subframe 800 extending across a plurality of TTIs according to an aspect of the present disclosure. In some configurations, this multi-TTI sidelink-centric subframe may be utilized for unicast communications. Although the example illustrated in FIG. 8 shows three TTIs (e.g., $TTI_N$, $TTI_{N+1}$, $TTI_{N+2}$), one of ordinary skill in the art will understand that any plural number of TTIs may be implemented without deviating from the scope of the present disclosure. The first TTI (e.g., $TTI_N$) may include the control portion 802 (e.g., PDCCH, as described in greater detail above), DSS 804, STS 806, and DRS 808 (as also described in greater detail above).

In this example, the DSS/STS communicated during DSS and/or STS may indicate a duration that extends across the plurality of TTIs (e.g., $TTI_N$, $TTI_{N+1}$, $TTI_{N+2}$). In other words, the DSS/STS may indicate a requested duration of time to keep the sidelink channel available for sidelink signals, and that requested duration may extend until the end of the last TTI (e.g., $TTI_{N+2}$) of the plurality of TTIs (e.g., $TTI_N$, $TTI_{N+1}$, $TTI_{N+2}$). If the sidelink channel is available for that requested duration of time, then the DRS may be communicated in the DRS portion 808 (as described in greater detail above). Although the plurality of TTIs (e.g., $TTI_N$, $TTI_{N+1}$, $TTI_{N+2}$) each include a sidelink data portion 810, 816, 822, not every TTI necessarily requires DSS 804 and/or STS 806. By not including DSS 804 and/or STS 806 in every TTI of the plurality of TTIs (e.g., $TTI_N$, $TTI_{N+1}$, $TTI_{N+2}$) in the subframe 800, the overall amount of overhead is relatively lower than it would otherwise be (e.g., if DSS 804 and/or STS 806 were included in every TTI). By reducing overhead, relatively more of the TTIs (e.g., $TTI_{N+1}$, $TTI_{N+2}$) lacking DSS 804 and/or STS 806 can be utilized for communication of the sidelink data 816, 822, which thereby increases relative throughput.

Within the first TTI (e.g., $TTI_N$), DSS 804, STS 806, and DRS 808 may be followed by a first sidelink data portion 810 (which is described in greater detail above with reference to the sidelink data portion 710 in FIG. 7). The sidelink data portions 810, 816, 822 may each be followed by respective common UL portions 812, 818, 826 (which are described in greater detail above with reference to the common UL portion 714 in FIG. 7). In the example illustrated in FIG. 8, every TTI (e.g., $TTI_{N+1}$, $TTI_{N+2}$) following the first (e.g., $TTI_N$) includes a control portion 814, 820 at an initial/beginning portion of each subframe/TTI and a common UL portion 818, 826 at the end portion of each subframe/TTI. By providing the control portion 814, 820 at the initial/beginning of each subframe/TTI and providing the common UL portion 818, 826 at the end portion of each subframe/TTI, the sidelink-centric subframes have a structure that minimizes the likelihood of interference with DL/UL control/scheduling information of nominal traffic (as described in greater detail above).

In the example illustrated in FIG. 8, the sidelink-centric subframes include a single sidelink acknowledgement portion 824 in a last/final TTI (e.g., $TTI_{N+2}$) of the plurality of TTIs (e.g., $TTI_N$, $TTI_{N+1}$, $TTI_{N+2}$). The acknowledgement information communicated in the sidelink acknowledgement portion 824 in the last/final TTI (e.g., $TTI_{N+2}$) may correspond to the sidelink signals included in one or more (e.g., all) preceding sidelink data portions 810, 816, 822. For example, the sidelink acknowledgement portion 824 may include a HARQ identifier corresponding to sidelink signals communicated throughout the sidelink data portions 810, 816, 822 of the plurality of TTIs (e.g., $TTI_N$, $TTI_{N+1}$, $TTI_{N+2}$) in the multi-TTI subframe 800. Because the sidelink acknowledgment portion 824 is not included in every TTI (e.g., $TTI_N$, $TTI_{N+1}$), the overall amount of overhead is relatively lower than it would otherwise be (e.g., if a sidelink acknowledgement portion were included in every TTI). By reducing overhead, relatively more of the TTIs (e.g., $TTI_N$, $TTI_{N+1}$) lacking the sidelink acknowledgement portion 824 can be utilized for communication of sidelink data, which thereby increases relative throughput. However, one of ordinary skill in the art will readily understand that the example illustrated in FIG. 8 is non-limiting and alternative configurations may exist without necessarily deviating from the scope of the present disclosure.

FIG. 9 is a diagram illustrating one example of such an alternative subframe configuration 900. Various aspects illustrated in FIG. 9 (e.g., control portions 902, 916, 924; DSS 904; STS 906; DRS 908; and common UL portions 914, 922, 930) are described above with reference to FIG. 8 and therefore will not be repeated here to avoid redundancy. An aspect in which the example illustrated in FIG. 9 may differ from the example illustrated in FIG. 8 is that the example in FIG. 9 includes a sidelink acknowledgement portion 912, 920, 928 in every TTI of the plurality of TTIs (e.g., $TTI_N$, $TTI_{N+1}$, $TTI_{N+2}$). For example, each sidelink acknowledgement portion 912, 920, 928 may respectively communicate acknowledgement information corresponding to a sidelink signal included in the sidelink data portion 910, 918, 926 in its TTI. By receiving acknowledgement information corresponding to the sidelink signal in that particular TTI, the scheduled entity 204 (e.g., UE) may obtain relatively better specificity regarding the communication success of each sidelink signal. For example, if only one sidelink signal in a single sidelink data portion (e.g., sidelink data portion 910) is not successfully communicated, retransmission can be limited to only the affected sidelink portion (e.g., sidelink data portion 910) without the burden of retransmitting unaffected sidelink portions (e.g., other sidelink data portions 918, 926).

Figure 10:
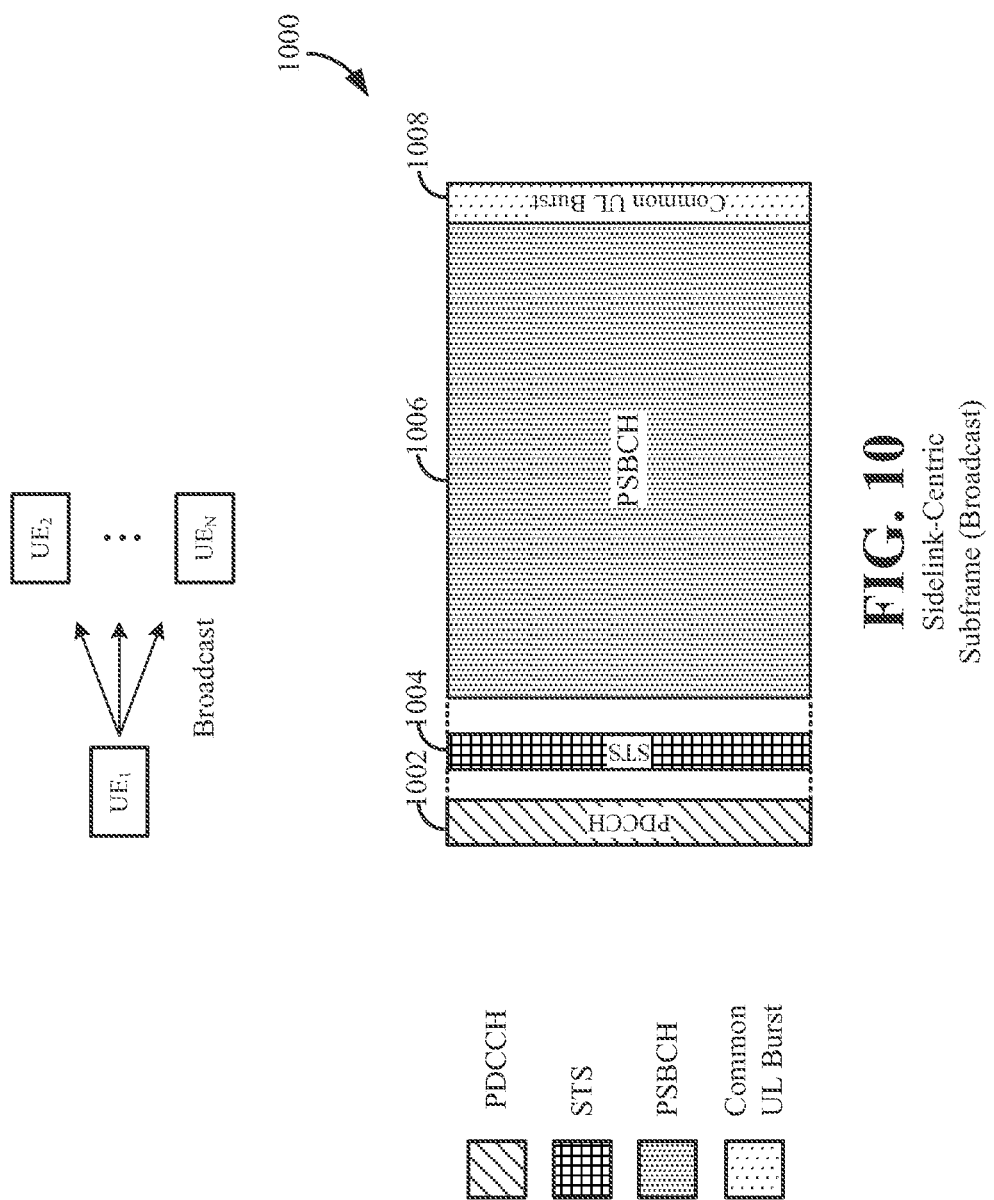
FIG. 10 is a diagram illustrating an example of a sidelink-centric subframe for broadcast communication according to some aspects of the present disclosure.

FIG. 10 is a diagram illustrating another example of a sidelink-centric subframe 1000 according to some aspects of the present disclosure. In some configurations, this sidelink-centric subframe 1000 may be utilized for broadcast communication. A broadcast communication may refer to a point-to-multipoint transmission by one scheduled entity 204 (e.g., $UE_1$) to a set of one or more scheduled entities 204 (e.g., $UE_2$-$UE_N$). Description corresponding to aspects of a control portion 1002 and common UL portion 1008 are provided above with reference to preceding figures and therefore will not be repeated to avoid redundancy.

The example of the sidelink-centric subframe 1000 illustrated in FIG. 10 further includes a source transmit signal (STS) portion 1004. Similar to the STS described above with respect to the unicast sidelink-centric subframe, here, the STS portion 1004 may refer to a portion of the subframe during which one scheduled entity 204 (e.g., UE) communicates an STS indicating a requested duration of time (e.g., one or more TTIs) to keep a sidelink channel available for a sidelink signal. One of ordinary skill in the art will understand that the STS may include various additional or alternative information without necessarily deviating from the scope of the present disclosure. In some configurations, the STS may include a group destination identifier (ID). The group destination ID may correspond to a group or set of one or more devices intended to receive the STS. In some configurations, the STS may indicate a duration of the sidelink transmission, and/or may include a reference signal (RS) to enable channel estimation and RX-yielding (described below), a modulation and coding scheme (MCS) indicator, and/or various other information. In some examples, the STS RS may be transmitted at a higher (e.g., boosted) power level to provide additional protection of the broadcast. Further, the STS MCS indicator may be utilized to inform the receiving device of the MCS utilized for transmissions in the data portion 1006.

A first scheduled entity 204 (e.g., $UE_1$) may broadcast an STS to one or more other scheduled entities 204 (e.g., $UE_2 \ldots UE_N$) to request that the other scheduled entities 204 (e.g., $UE_2 \ldots UE_N$) refrain from using the sidelink channel for the requested duration of time, thereby leaving the sidelink channel available for the first scheduled entity 204 (e.g., $UE_1$). By transmitting the STS, the first scheduled entity 204 (e.g., $UE_1$) can effectively reserve the sidelink channel for a sidelink signal. This enables distributed scheduling and management of interference that might otherwise occur from another sidelink communication from other scheduled entities 204 (e.g., $UE_2$-$UE_N$). Put another way, because the other scheduled entities 204 (e.g., $UE_2 \ldots UE_N$) are informed that the first scheduled entity 204 (e.g., $UE_1$) will be transmitting for the requested period of time, the likelihood of interference between sidelink signals is reduced.

The sidelink-centric subframe 1000 may also include a sidelink data portion 1006. The sidelink data portion 1006 may sometimes be referred to as the payload or sidelink-burst of the sidelink-centric subframe. In an example where the sidelink-centric subframe is utilized for broadcast communications, the sidelink data portion 1006 may carry a physical sidelink broadcast channel (PSBCH). The sidelink data portion 1006 may include the communication resources utilized to communicate sidelink data from one scheduled entity 204 (e.g., $UE_1$) to one or more other scheduled entities 204 (e.g., $UE_2$, $UE_3$).

According to a further aspect of the disclosure, a broadcast sidelink-centric subframe may take on certain characteristics based on whether or not the broadcast is separated from other sidelink devices that utilize unicast sidelink-centric subframes as described above. Here, a broadcast sidelink-centric subframe utilized in the absence of unicast sidelink-centric subframe transmissions may be referred to as an orthogonalized broadcast, while a broadcast sidelink-centric subframe utilized in the presence of unicast sidelink-centric subframe transmissions may be referred to as an in-band broadcast.

Figure 11:
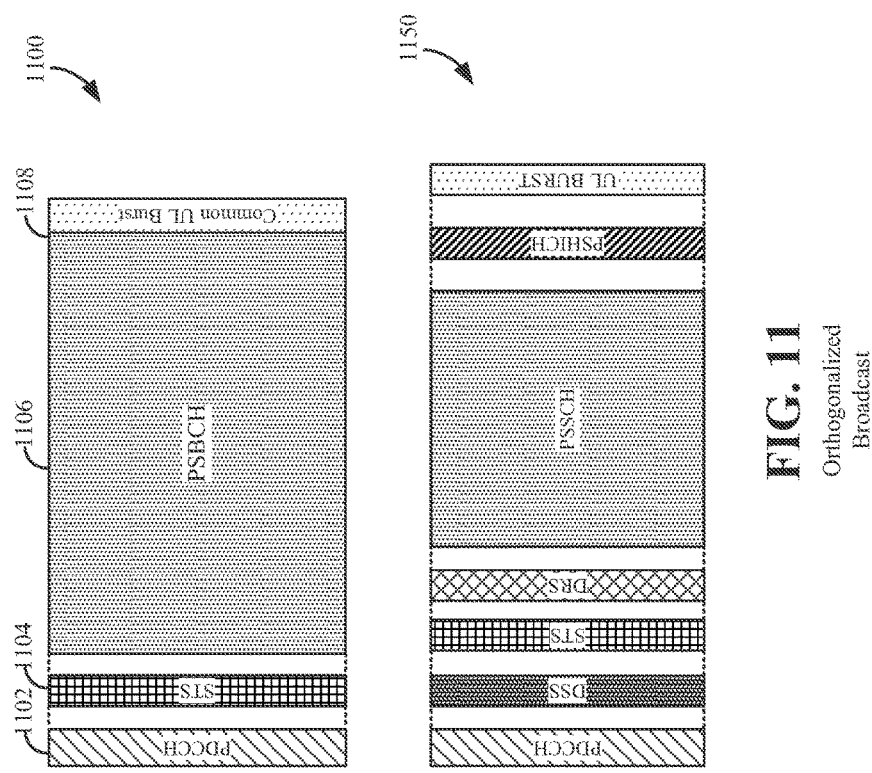
FIG. 11 is a diagram illustrating an example of a sidelink-centric subframe for orthogonalized broadcast according to some aspects of the present disclosure.

For example, FIG. 11 is a diagram illustrating a broadcast sidelink-centric subframe 1100 for orthogonalized broadcast (e.g., in the absence of unicast sidelink-centric subframe transmissions). This illustration shows the broadcast sidelink-centric subframe 1100 aligned with a unicast sidelink-centric subframe 1150 for the purpose of comparison. As seen here, the broadcast sidelink-centric subframe 1100 may include relatively small gaps or guard periods around the STS region 1104 and the control region 1102 and data region 1106. Further, the data region 1106 may fill out most or all of the broadcast sidelink-centric subframe 1100 after the STS region 1104 and before the common UL burst 1108, taking no heed of any potential interference with potentially sensitive control transmissions in a unicast sidelink-centric subframe 1150.

Figure 12:
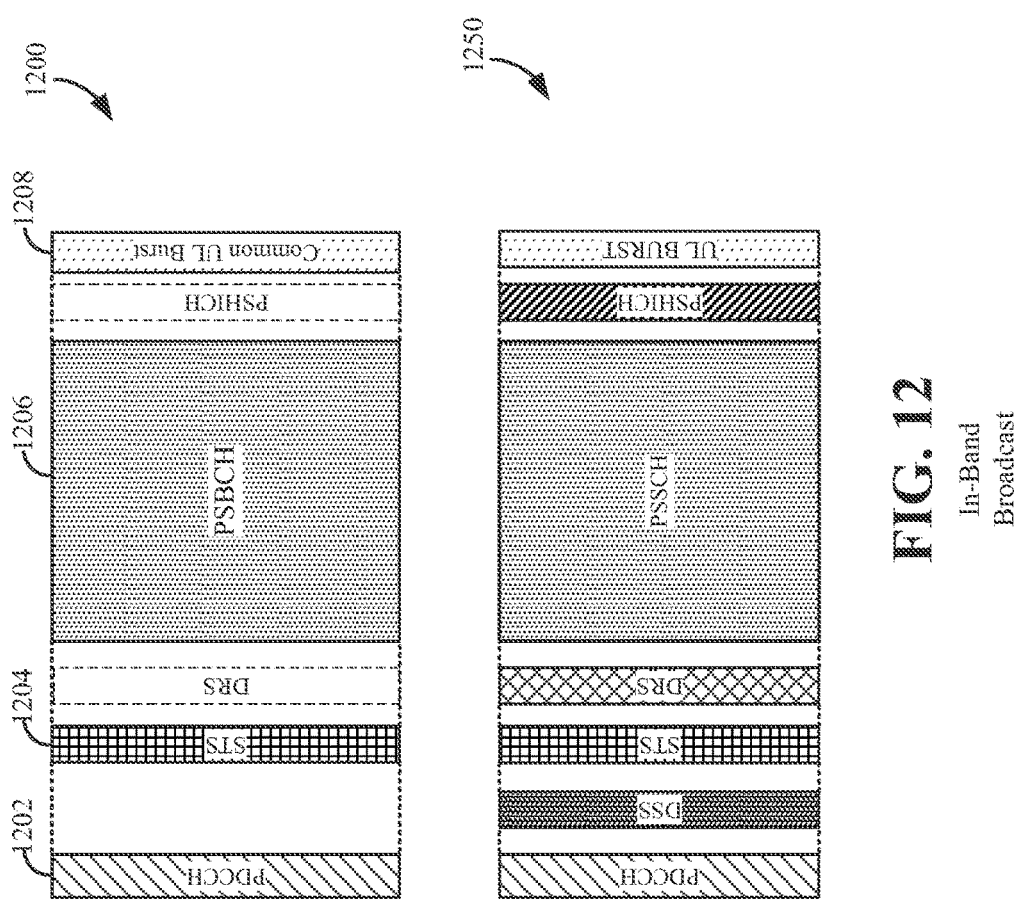
FIG. 12 is a diagram illustrating an example of a sidelink-centric subframe for in-band broadcast according to some aspects of the present disclosure.

FIG. 12 is a diagram illustrating a broadcast sidelink-centric subframe 1200 for in-band broadcast (e.g., in the presence of unicast sidelink-centric subframe transmissions). This illustration also shows the broadcast sidelink-centric subframe 1200 aligned with a unicast sidelink-centric subframe 1250 for the purpose of comparison. As seen here, the broadcast sidelink-centric subframe 1200 may include larger gaps before and after the STS region 1204 of the broadcast sidelink-centric subframe 1200, to protect the DRS and DSS regions of the unicast sidelink-centric subframe transmissions. Furthermore, the broadcast sidelink-centric subframe 1200 may include a larger gap between the sidelink data region 1206 and the common UL burst region 1208 to protect the acknowledgment portion (e.g., PSHICH) of the unicast sidelink-centric subframe transmissions.

In some aspects of the disclosure, a device that is utilizing the broadcast sidelink-centric subframe 1200 may be configured to yield to higher-priority unicast transmissions. Accordingly, the device utilizing the broadcast sidelink-centric subframe 1200 may be configured to monitor for a DSS transmission within a unicast sidelink-centric subframe 1250, reserving the sidelink channel.

In a further aspect of the disclosure, the broadcast sidelink-centric subframe 1200 for in-band broadcast may be modified to include a DRS region and/or an acknowledgment region, as described above in connection with the unicast sidelink-centric subframe. That is, in some examples, a subset of the devices receiving the broadcast transmission may be configured to transmit a DRS to the broadcasting device, informing that device about the availability of the channel. Similarly, in some examples, a subset of the devices receiving the broadcast transmission may be configured to provide the broadcasting device HARQ feedback in a HARQ or acknowledgment region. To accommodate these examples, multiple DRS/HARQ resources may be provisioned for each broadcast.

Figure 13:
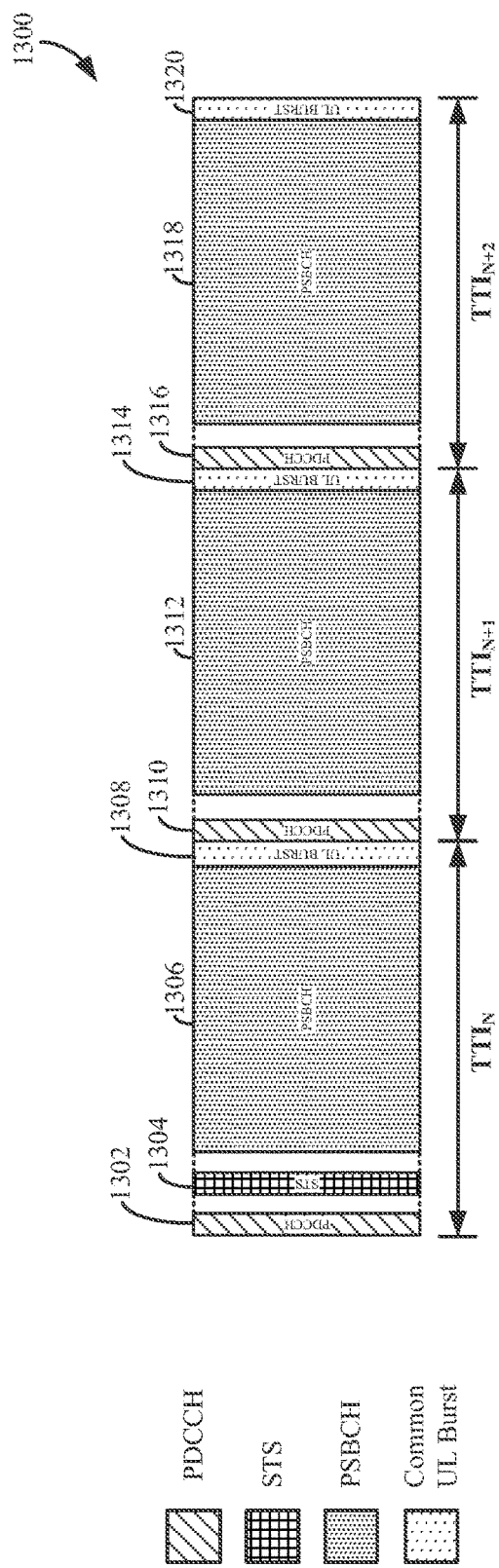
FIG. 13 is a diagram illustrating another example of a broadcast sidelink-centric subframe that includes a plurality of TTIs according to some aspects of the disclosure.

FIG. 13 is a diagram illustrating an example of a sidelink-centric subframe 1300 that includes a plurality of TTIs according to some aspects of the disclosure. As with the examples described above in relation to FIGS. 10-12, in some configurations, the sidelink-centric subframe 1300 in FIG. 13 may be utilized for broadcast communication. Although the example illustrated in FIG. 13 shows three TTIs (e.g., $TTI_N$, $TTI_{N+1}$, $TTI_{N+2}$), one of ordinary skill in the art will understand that any plural number of TTIs may be implemented within a sidelink-centric subframe as described herein without deviating from the scope of the present disclosure. In FIG. 13, the first TTI (e.g., $TTI_N$) may include a control portion 1302 (e.g., PDCCH, as described in greater detail above) and an STS portion 1304 (as also described in greater detail above). The STS portion 1304 may indicate a duration that extends across the plurality of TTIs (e.g., $TTI_N$, $TTI_{N+1}$, $TTI_{N+2}$). In other words, the STS may indicate a requested duration of time to keep the sidelink channel available for broadcast sidelink signals, and that requested duration may extend until the end of the last TTI (e.g., $TTI_{N+2}$) of the plurality of TTIs (e.g., $TTI_N$, $TTI_{N+1}$, $TTI_{N+2}$). Therefore, although the plurality of TTIs (e.g., $TTI_N$, $TTI_{N+1}$, $TTI_{N+2}$) each include a sidelink data portion 1306, 1312, 1318, not every TTI necessarily requires the STS portion 1304. By not including the STS portion 1304 in every TTI of the plurality of TTIs (e.g., $TTI_N$, $TTI_{N+1}$, $TTI_{N+2}$) in the subframe 1300, the overall amount of overhead is relatively lower than it would otherwise be (e.g., if the STS portion 1304 was included in every TTI). By reducing overhead, relatively more of the TTIs (e.g., $TTI_{N+1}$, $TTI_{N+2}$) lacking the STS portion 1304 can be utilized for communication of the sidelink data 1312, 1318, which thereby increases relative throughput.

Within the first TTI (e.g., $TTI_N$), the STS portion 1304 may be followed by a sidelink data portion 1306 (which is described in greater detail above with reference to the sidelink data portion 1006 in FIG. 10). The sidelink data portion 1306 may be followed by the common UL portion 1308 (which is described in greater detail above with reference to the common UL portion 1008 in FIG. 10). In the example illustrated in FIG. 13, every TTI (e.g., $TTI_{N+1}$, $TTI_{N+2}$) following the first TTI (e.g., $TTI_N$) includes a control portion 1310, 1316 at an initial/beginning portion of each TTI and a common UL portion 1314, 1320 at the end portion of each TTI. By providing the control portion 1310, 1316 at the initial/beginning of each TTI and providing the common UL portion 1314, 1320 at the end portion of each TTI, the sidelink-centric subframes have a structure that minimizes the likelihood of interference with DL/UL control/scheduling information of nominal traffic (as described in greater detail above).

The example in FIG. 13 has been described as a single sidelink-centric subframe 1300 including a plurality of TTIs. However, it is to be understood that the definition of subframe within the present disclosure is intended to be broad, and not limiting as to the duration of the sidelink-centric subframe 1300. That is, in some technologies, a subframe may always have a duration of a single TTI. Those of ordinary skill in the art will recognize that this only presents a difference in terminology, and aspects of the present disclosure may apply therein. For example, referring to FIG. 13, it may alternatively be understood that the first TTI (e.g., $TTI_N$) corresponds to a first subframe, and each of the following TTIs (e.g., $TTI_{N+1}$-$TTI_{N+2}$) correspond to subsequent subframes. In this example, the STS 1304 within the first TTI (e.g., $TTI_N$) or first subframe may reserve the sidelink channel over a plurality of subframes in the same way as described above.

Furthermore, while the illustration in FIG. 13 utilizes the orthogonalized broadcast subframe structure described above and illustrated in FIG. 11, this is merely one example. Those of ordinary skill in the art will recognize that each of the TTIs in FIG. 13 may equivalently utilize the in-band broadcast subframe structure described above and illustrated in FIG. 12.

Figure 14:
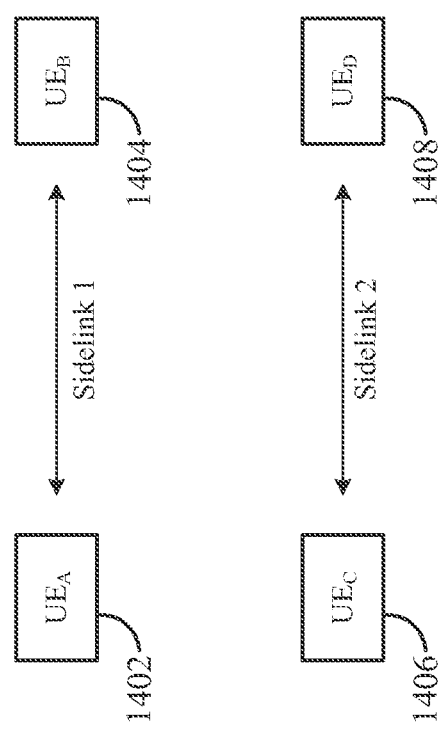
FIG. 14 is a schematic diagram of two sidelink signals between two pairs of UEs or scheduled entities, to illustrate receive (RX)-yielding and transmit (TX)-yielding according to various aspects of the present disclosure.

FIG. 14 is a schematic diagram of two sidelink signals between two pairs of UEs or scheduled entities 204, to illustrate receive (RX)-yielding and transmit (TX)-yielding according to various aspects of the present disclosure. FIG. 14 illustrates a first sidelink signal $Sidelink_1$ between $UE_A$ 1402 and $UE_B$ 1404, and a second sidelink signal $Sidelink_2$ between $UE_C$ 1406 and $UE_D$ 1408. In this example, it is assumed that $UE_A$ 1402 has priority access to the sidelink channel (e.g., $Sidelink_1$ has a higher priority than $Sidelink_2$). Broadly, "priority access" may in some examples refer to an absolute or highest level of priority among a given set of two or more UEs or scheduled entities. In other examples, "priority access" may refer to a relative priority, where a first UE has priority access from the point of view of a second UE when the first UE has a higher priority than the second UE.

In the illustrated example, $UE_A$ and $UE_C$ may concurrently transmit STSs/DSSs identifying $UE_B$ and $UE_D$, respectively. One or both of these transmissions may in some examples be DSSs corresponding to a broadcasted sidelink transmission, where the identified UE is one among a group of UEs identified by a group destination ID in the transmitted DSS. In other examples, one or both of these transmissions may be STSs/DSSs corresponding to a unicasted sidelink transmission, where the identified UE is uniquely identified by a destination ID in the transmitted STS/DSS.

According to an aspect of the disclosure, $UE_D$ 1408 may receive both STS/DSS signals (i.e., one from $UE_A$ 1402 and another from $UE_B$ 1404). Here, one of the STS/DSS signals (e.g., the STS/DSS transmitted by $UE_C$ 1406) may identify $UE_D$, so it may be expected for $UE_D$ 1408 to respond by transmitting a DRS. However, if $UE_D$ 1408 is configured to implement RX-yielding, $UE_D$ 1408 may be configured to detect the STS/DSS transmitted by $UE_A$ 1402. As described above, an STS/DSS may include a reference signal (RS). In some examples, the RS may be configured to indicate an STS/DSS transmission by a device having priority access to the sidelink channel. Accordingly, because $Sidelink_1$ has a higher priority than $Sidelink_2$, $UE_D$ 1408 may refrain from transmitting the DRS. In other words, because $UE_A$ 1402 has priority access to the sidelink channel, $UE_D$ 1408 may forgo to respond to the STS/DSS with a DRS, to reduce interference to the priority sidelink signal. Accordingly, the relatively lower priority sidelink (Sidelink$_2$) yields communication of the DRS, and access to the sidelink channel, under these circumstances.

In a further aspect of the disclosure relating to TX-yielding, in the scenario where UE$_A$ 1402 and UE$_C$ 1406 concurrently transmit respective STSs/DSSs to UE$_B$ 1404 and UE$_D$ 1408, respectively, UE$_B$ 1404 may transmit a DRS. For example, UE$_B$ 1404 may not be configured to implement RX-yielding, and/or UE$_B$ 1404 may determine, based for example on the presence of an RS within the STS/DSS that identifies UE$_B$ 1404, that Sidelink$_1$ has relatively higher priority than Sidelink$_2$. As discussed above, when it transmits the DRS, UE$_B$ 1404 may include a reference signal (RS) that is configured to inform other devices that wish to access the sidelink channel (e.g., UE$_C$ 1406) that it will interfere with their sidelink communication during a particular period of time.

After transmitting its STS/DSS, UE$_C$ 1406 may monitor for a DRS in response. In some examples, UE$_C$ 1406 may receive the DRS from UE$_D$ 1408. However, whether or not it receives the DRS from UE$_D$ 1408, here, UE$_C$ 1406 may receive the DRS from UE$_B$ 1404 including the RS described above. Accordingly, by receiving this RS, UE$_C$ 1406 may determine to refrain from communicating over the sidelink channel for that particular period of time (e.g., at least for the duration of the sidelink communication of Sidelink$_1$). Accordingly, the relatively lower priority sidelink (Sidelink$_2$) yields communication for a particular period of time under these circumstances.

Figure 15:
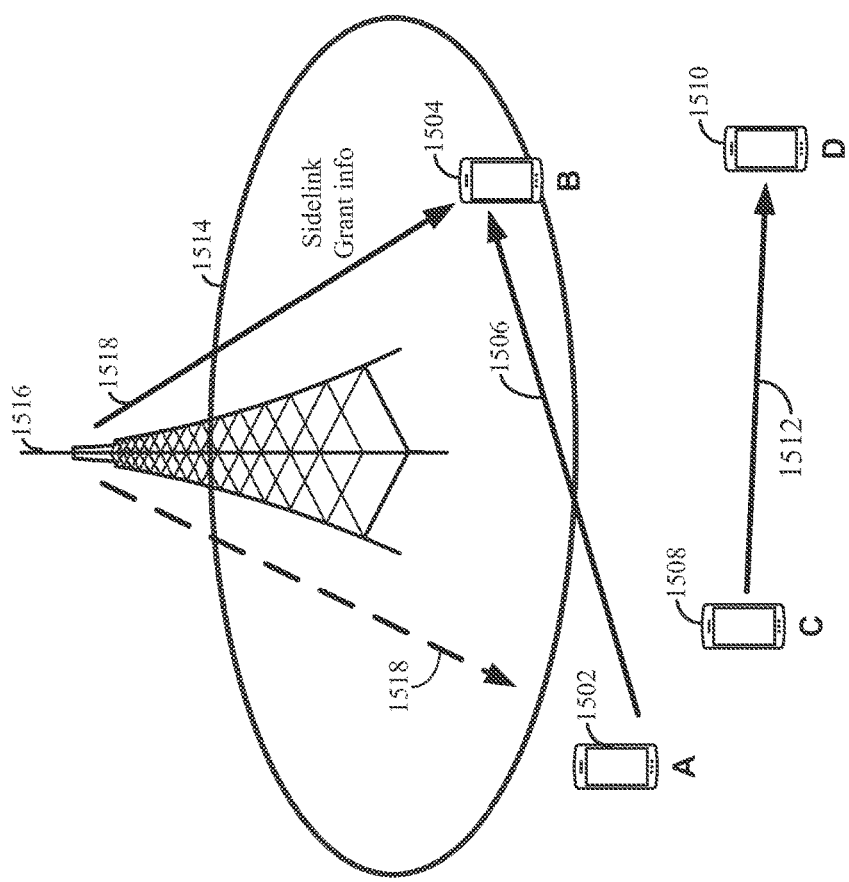
FIG. 15 is a diagram illustrating some exemplary out-of-coverage (OoC) scenarios when sidelink communication among scheduled entities.

FIG. 15 is a diagram illustrating some exemplary out-of-coverage (OoC) scenarios when using signaling communication. For example, UE$_A$ 1502 (e.g., a first scheduled entity 204) may need to communicate with UE$_B$ 1504 (e.g., a second scheduled entity 204) using a first sidelink 1506, and UE$_C$ 1508 (e.g., a third scheduled entity 204) may need to communicate with UE$_D$ 1510 (e.g., a fourth scheduled entity 204) using a second sidelink 1512. However, UE$_A$ is located outside of the coverage area 1514 of a base station 1516 (e.g., a scheduling entity 202). Therefore, UE$_A$ cannot receive the sidelink grant information 1518 from the scheduling entity 1516. The sidelink grant information 1518 may refer to information or scheduling grant (e.g., PDCCH) that enables sidelink communication to occur between two sidelink devices (e.g., UE$_A$ and UE$_B$). Without the sidelink grant information, UE$_A$ cannot initiate and/or establish a sidelink channel with UE$_B$ or other sidelink devices. In another scenario, both sidelink devices UE$_C$ and UE$_D$ are out of the coverage area of the base station 1516. Therefore, both sidelink devices UE$_C$ and UE$_D$ cannot receive the sidelink grant information from the base station 1516.

Figure 16:
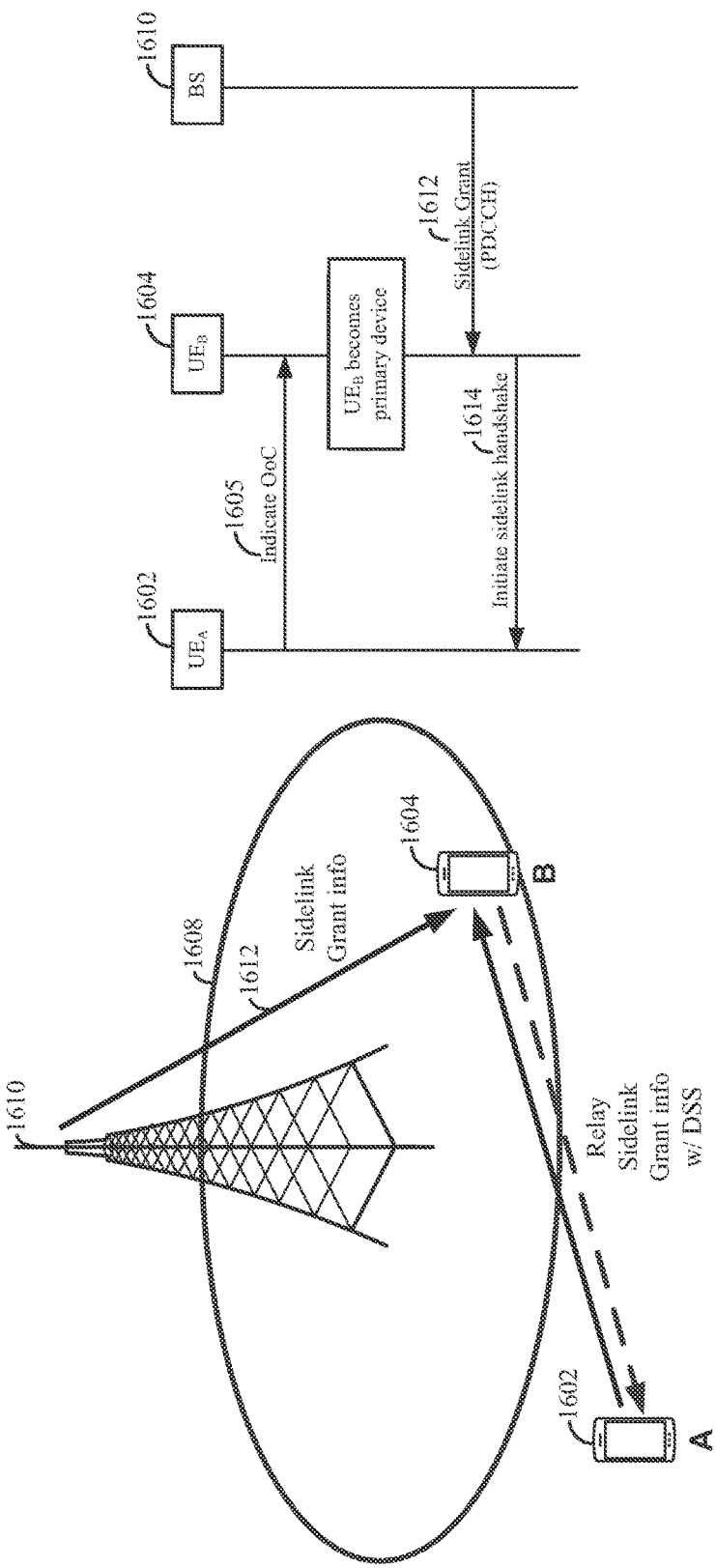
FIG. 16 is a diagram illustrating a sidelink signaling scheme for OoC sidelink devices according to some aspects of the present disclosure.

Aspects of the present disclosure provide some exemplary sidelink signaling processes for solving the out-of-coverage (OoC) problems described above in relation to FIG. 15. FIG. 16 is a diagram illustrating a sidelink signaling scheme for OoC sidelink devices according to some aspects of the present disclosure. Referring to FIG. 16, UE$_A$ 1602 (e.g., a first scheduled entity 204) indicates to UE$_B$ 1604 (e.g., a second scheduled entity 204) its OoC status 1605 during discovery and/or association. UE$_A$ may utilize a discovery process to discover and exchange information with UE$_B$. During the discovery process, UE$_A$ may transmit a discovery signal and its OoC status that may be received by UE$_B$. In this example, although UE$_A$ may have sidelink data (Tx data) for transmission, UE$_B$ becomes the primary device that initiates sidelink communication because only UE$_B$ is within the coverage area 1608 of a base station 1610 (e.g., a scheduling entity 202). In this case, UE$_B$ can receive the sidelink grant information 1612 in a DL channel (e.g., PDCCH) from the base station 1610. Without the sidelink grant information, UE$_A$ is unable to initiate a sidelink DSS/STS and DRS handshake as a primary device. Therefore, UE$_B$ can initiate a sidelink handshake 1614 to establish sidelink communication with OoC UE$_A$.

Figure 17:
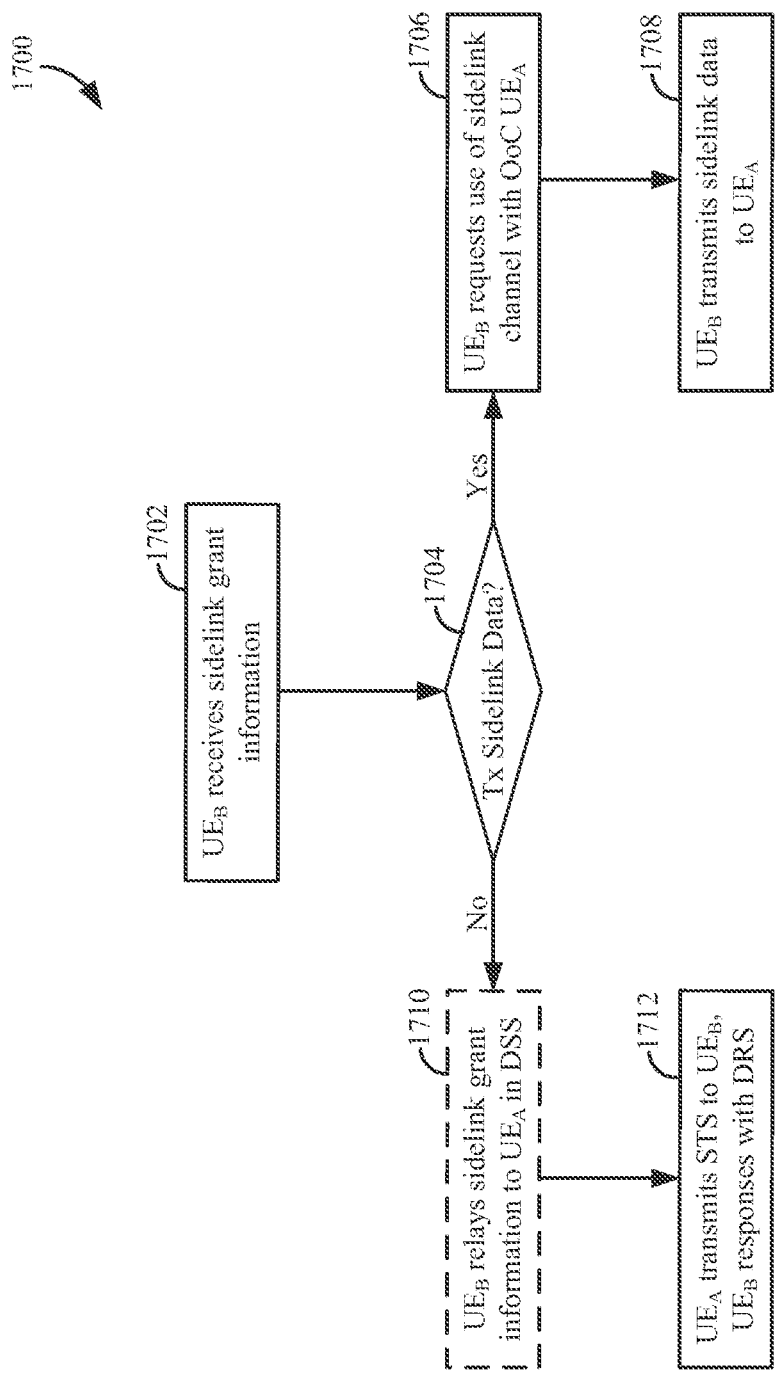
FIG. 17 is a diagram illustrating a process for establishing sidelink communication with an OoC sidelink device according to some aspects of the disclosure.

FIG. 17 is a diagram illustrating a process 1700 for establishing sidelink communication with an OoC sidelink device in accordance with some aspects of the disclosure. In one example, UE$_B$ 1604 may utilize this process to establish sidelink communication with UE$_A$ 1602. At block 1702, UE$_B$ may utilize a communication circuit 440 to receive sidelink grant information from a base station. However, as described above in relation to FIG. 16, UE$_A$ cannot receive the sidelink grant information because it is out-of-coverage (OoC). At decision block 1704, UE$_B$ may utilize a processing circuit to determine whether it has sidelink data to transmit to another sidelink device (e.g., UE$_A$). At block 1706, if UE$_B$ has sidelink data for transmission to UE$_A$, UE$_B$ may utilize the communication circuit 440 to initiate a DSS/STS and DRS handshake by transmitting (e.g., via a communication interface 410) a first sidelink handshake signal (e.g., DSS 704 of FIG. 7) to UE$_A$ to request to use a sidelink channel for a certain duration of time. In response to the DSS (first sidelink handshake signal), UE$_A$ may transmit a DRS (e.g., DRS 708 of FIG. 7) to indicate the availability of the sidelink channel. Then, at block 1708, UE$_B$ can proceed as described above in relation to FIGS. 7-9 using one or more sidelink subframes/TTIs as a primary device to utilize the communication circuit 440 to transmit via the communication interface 410 its sidelink data (e.g., a sidelink data portion 710) to UE$_A$.

At block 1710, if UE$_B$ has no sidelink data for transmission to UE$_A$, UE$_B$ may utilize its communication circuit 440 to retransmit, relay, or broadcast the sidelink grant information in a DSS (a first sidelink handshake signal) to UE$_A$ and/or other associated OoC devices. In one example, the DSS may include a flag that is set or configured to indicate to other sidelink devices not to perform RX-yielding based on this DSS. Without this flag, other sidelink device may refrain from transmitting due to Rx-yielding. Once UE$_A$ receives the relayed sidelink grant information, at block 1712, UE$_A$ can utilize its communication circuit 440 to transmit a second sidelink handshake signal (e.g., STS 706 of FIG. 7) to request the use of sidelink channel, and UE$_B$ may response with a DRS to indicate the availability of the requested sidelink channel. Then UE$_A$ can proceed as described above in relation to FIGS. 9-11 to transmit sidelink data to UE$_B$ using one or more sidelink subframes/TTIs.

In another aspect of the disclosure, UE$_B$ may not relay or retransmit sidelink grant information to UE$_A$. Because UE$_A$ can determine sidelink subframe/TTI timing based on signals (e.g., a sidelink reference signal) transmitted by UE$_B$ during an association or discovery process, UE$_A$ can transmit a DSS/STS to request the use of the sidelink channel without the sidelink grant information. If the requested sidelink channel is available, UE$_B$ transmits a DRS to UE$_A$. Otherwise, UE$_B$ can ignore the sidelink request from UE$_A$.

Figure 18:
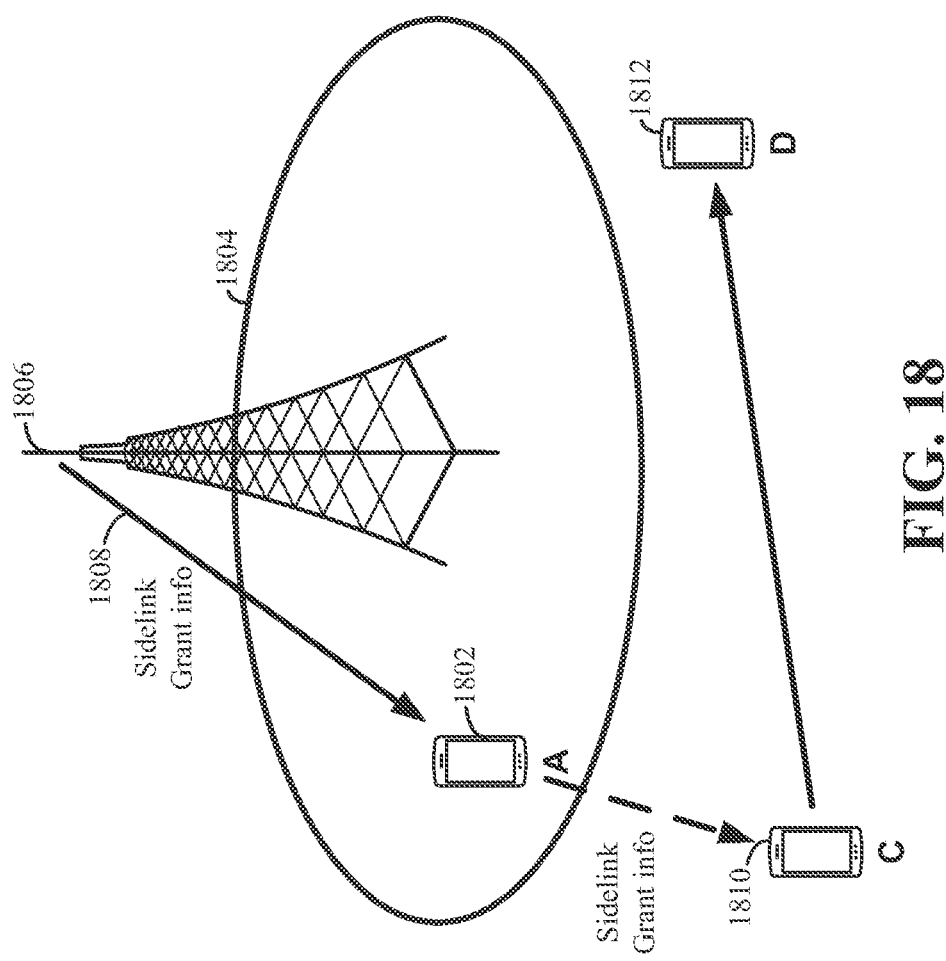
FIG. 18 is a diagram illustrating a sidelink signaling scheme for OoC sidelink devices according to some aspects of the present disclosure.
Figure 19:
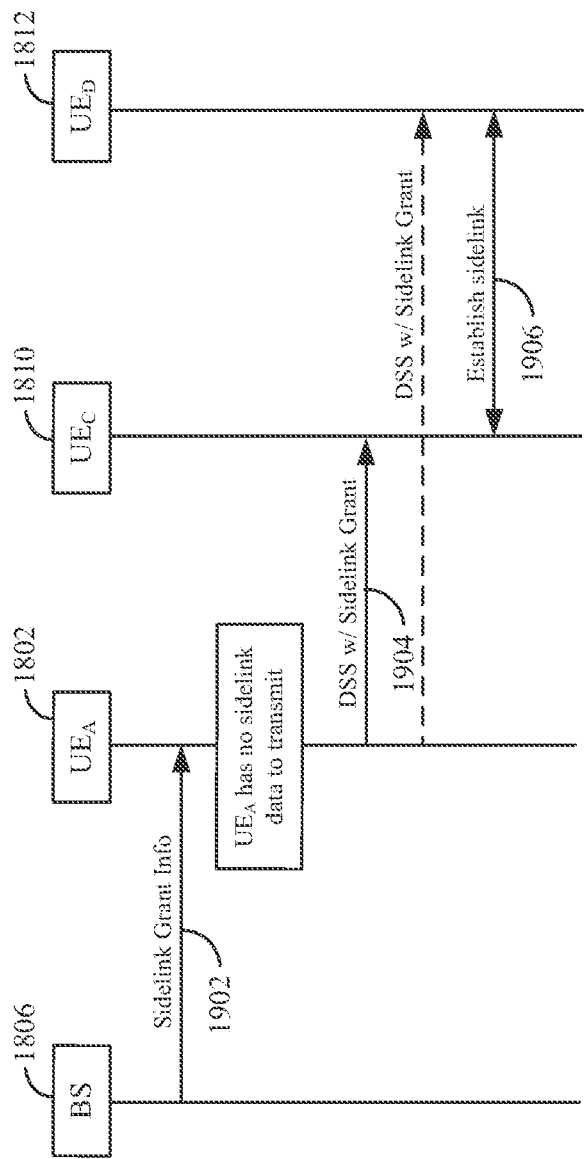
FIG. 19 is a diagram illustrating a process for providing sidelink grant information to OoC sidelink devices according to some aspects of the disclosure.

FIG. 18 is a diagram illustrating a sidelink signaling scheme for OoC sidelink devices according to some aspects of the present disclosure. Referring to FIG. 18, UE$_A$ 1802 (e.g., a first scheduled entity 204) is within a coverage area 1804 of a base station 1806 (e.g., a scheduling entity) such that UE$_A$ 1802 can receive sidelink grant information 1808 from the base station, for example, in a PDCCH. However, UE$_C$ 1810 and UE$_D$ 1812 (e.g., second and third subordinate entities) are OoC and cannot receive the sidelink grant information from the base station. Without the sidelink grant information, UE$_C$ and UE$_D$ cannot perform a DSS/STS and DRS handshake to establish a sidelink channel in order to communicate sidelink data.

According to aspects of the disclosure, UE$_A$ 1802 may retransmit, relay, or rebroadcast sidelink grant information to OoC UE$_C$ 1810, UE$_D$ 1812 and/or other OoC sidelink devices. In one aspect of the disclosure, referring to FIG. 19, in-coverage UE$_A$ 1802 can receive sidelink grant information 1902 from the base station 1806. When UE$_A$ has no sidelink data for transmission, it can rebroadcast, relay, or retransmit the sidelink grant information 1904 to UE$_C$ 1810 and/or UE$_D$ 1812 using, for example, a first sidelink handshake signal (e.g., DSS 704 of FIG. 7). In this case, the OoC devices may or may not be associated with UE$_A$ as sidelink peers. In one example, the DSS carrying the sidelink grant information may include a flag that is set or configured to indicate to neighboring devices not to perform RX-yielding based on this DSS. After receiving the sidelink grant information in the DSS, UE$_C$ or UE$_D$ may initiate a DSS/STS and DRS handshake 1906 with the other device to establish a sidelink channel. For example, UE$_C$, as a primary device, can establish sidelink communication by transmitting a DSS/STS to request the use of a sidelink channel. In response, UE$_D$ may transmit a DRS to indicate the availability of the sidelink channel.

Figure 20:
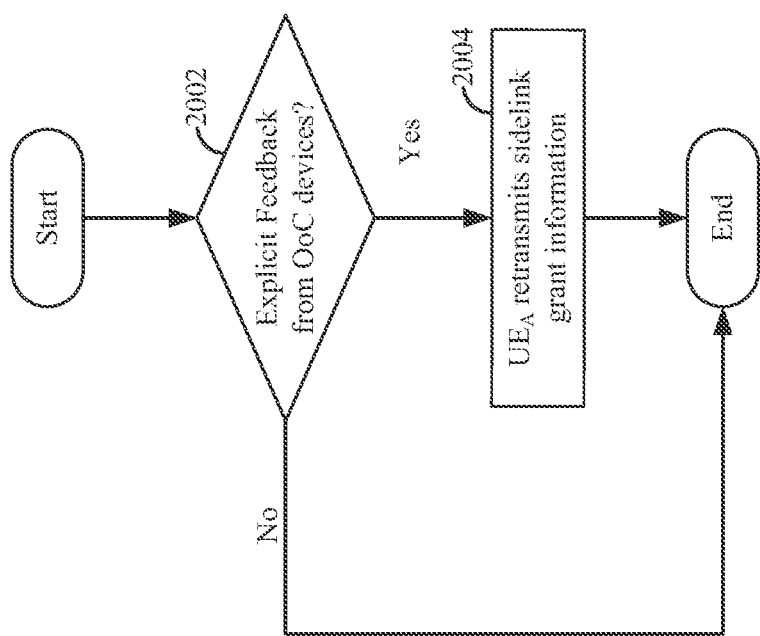
FIG. 20 is a diagram illustrating a process for determining whether an explicit feedback is received from an OoC sidelink device according to an aspect of the present disclosure.

In another aspect of the disclosure, referring to FIG. 20, UE$_A$ 1802 may utilize the processing circuit 442 to determine at decision block 2002 whether an explicit feedback is received from an OoC device (e.g., UE$_C$ or UE$_D$) that receives timing information from UE$_A$. For example, during discovery and/or association, sidelink devices may exchange certain timing signals for timing and/or subframe synchronization. At block 2004, UE$_A$ may utilize the communication circuit 440 to retransmit, relay, or rebroadcast the sidelink grant information only if UE$_A$ receives the explicit feedback from one or more OoC devices (e.g., UE$_C$ and UE$_D$). For example, during sidelink association, UE$_A$ may exchange timing signals with neighboring devices. When a neighboring device (e.g., UE$_C$ and/or UE$_D$) receives a timing signal from UE$_A$, the neighboring device may provide a timing feedback to UE$_A$. Therefore, in this example, if UE$_A$ does not receive any feedback or echo of its timing signal, UE$_A$ does not retransmit, relay, or rebroadcast the sidelink grant information.

Figure 21:
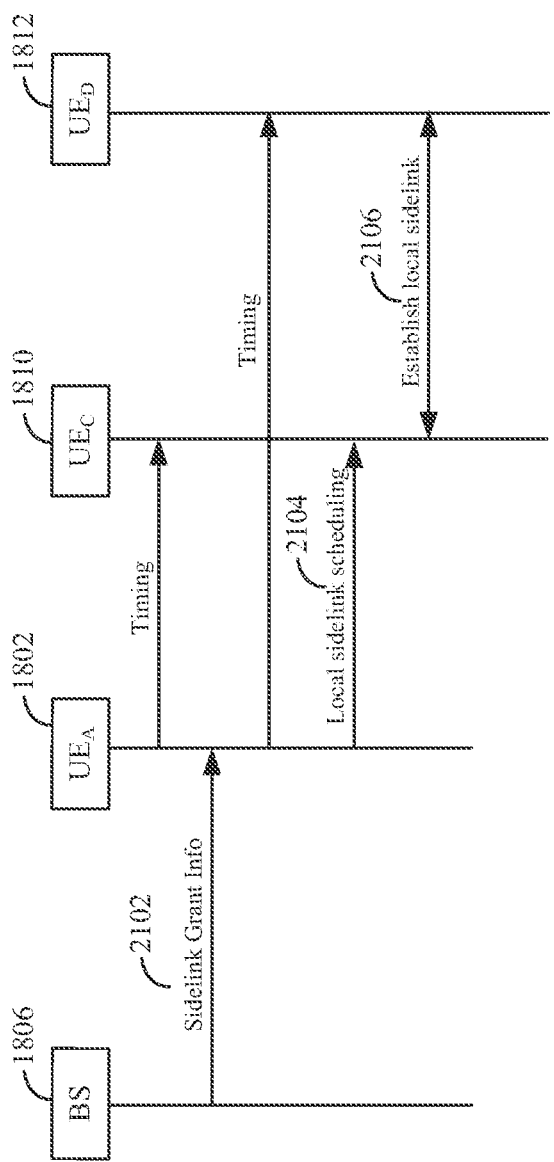
FIG. 21 is a diagram illustrating a process for performing local sidelink scheduling according to some aspects of the present disclosure.

In another aspect of the disclosure, referring to FIG. 21, after UE$_A$ 1802 receives sidelink grant information 2102 from the base station 1806, UE$_A$ 1802 may perform local sidelink scheduling based on the received sidelink grant information. For example, UE$_A$ may schedule specific OoC devices (e.g., UE$_C$ and/or UE$_D$) deriving timing from it by transmitting PDCCH equivalent information in a sidelink specific DSS destined to the specific OoC devices. In this example, the sidelink specific DSS may include a destination ID or a group destination ID that indicates the specific OoC apparatus(es) destined to receive the DSS signal containing local sidelink scheduling information. In one example, the sidelink grant information from the base station 1806 may generally indicate that certain subframes/TTIs may be used for sidelink communication. Therefore, during local sidelink scheduling, UE$_A$ may schedule specific OoC device(s) to use a particular subframe/TTI for sidelink communication. For example, UE$_A$ may transmit a sidelink specific DSS 2104 including local sidelink grant information to UE$_C$ to schedule it to utilize a predetermined TTI/subframe for sidelink communication. Then UE$_C$ can transmit a DSS/STS to UE$_D$ to initiate sidelink communication 2106 in the predetermined TTI/subframe.

Figure 22:
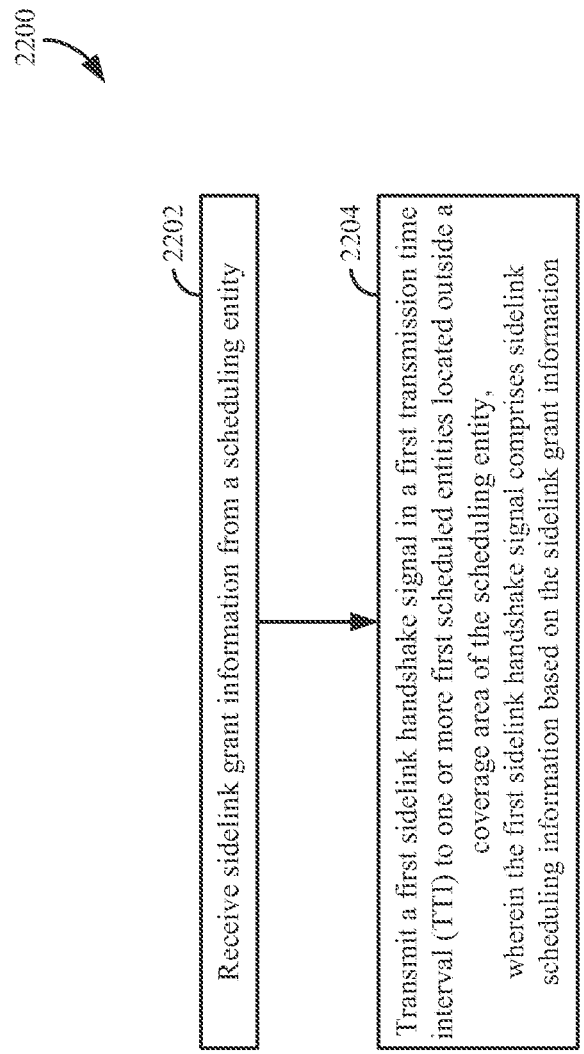
FIG. 22 is a flowchart illustrating a method of providing sidelink grant information to OoC sidelink devices according to some aspects of the present disclosure.

FIG. 22 is a flowchart illustrating a method 2200 of providing sidelink grant information to OoC sidelink devices according to some aspects of the present disclosure. The method of FIG. 22 may be implemented or executed using any of the scheduled entities or UEs for example as described in relation to FIGS. 1, 2, 4, 14-16, 18, 19, and 21. In one particular example, the method may be performed using the scheduled entity 204 as configured in FIG. 4. At block 2202, an apparatus may utilize the communication circuit 440 to receive sidelink grant information from a scheduling entity in a certain TTI. For example, the apparatus may be UE$_B$ of FIG. 16 or UE$_A$ of FIG. 18 that receives sidelink grant information from a scheduling entity (e.g., base station 1610 or 1806). At block 2204, the apparatus may utilize the communication circuit 440 to transmit a first sidelink handshake signal in a first TTI to one or more first scheduled entities located outside a coverage area of the scheduling entity. For example, the first scheduled entities may be UE$_A$ of FIG. 16, UE$_C$/UE$_D$ of FIG. 18, or any OoC devices associated with the apparatus.

In this case, the first sidelink handshake signal may include sidelink scheduling information based on the sidelink grant information. For example, the apparatus uses the first sidelink handshake signal to retransmit, relay, or rebroadcast the sidelink grant information as sidelink scheduling information. In some examples, the first sidelink handshake signal may be a DSS as illustrated in FIGS. 7-9. The above described method 2200 of FIG. 22 enables an OoC scheduled entity to establish a sidelink channel with another sidelink device. The sidelink scheduling information may be the same as sidelink grant information. In other examples, the sidelink grant information may provide information on resources (e.g., time and/or frequency resources) available for sidelink communication in general, and the sidelink scheduling information may provide specific scheduling and timing information for a specific sidelink. For example, the sidelink scheduling information may include local sidelink scheduling information that is destined to a predetermined scheduled entity and schedules the device to use a particular TTI/subframe for sidelink communication.

Figure 23:
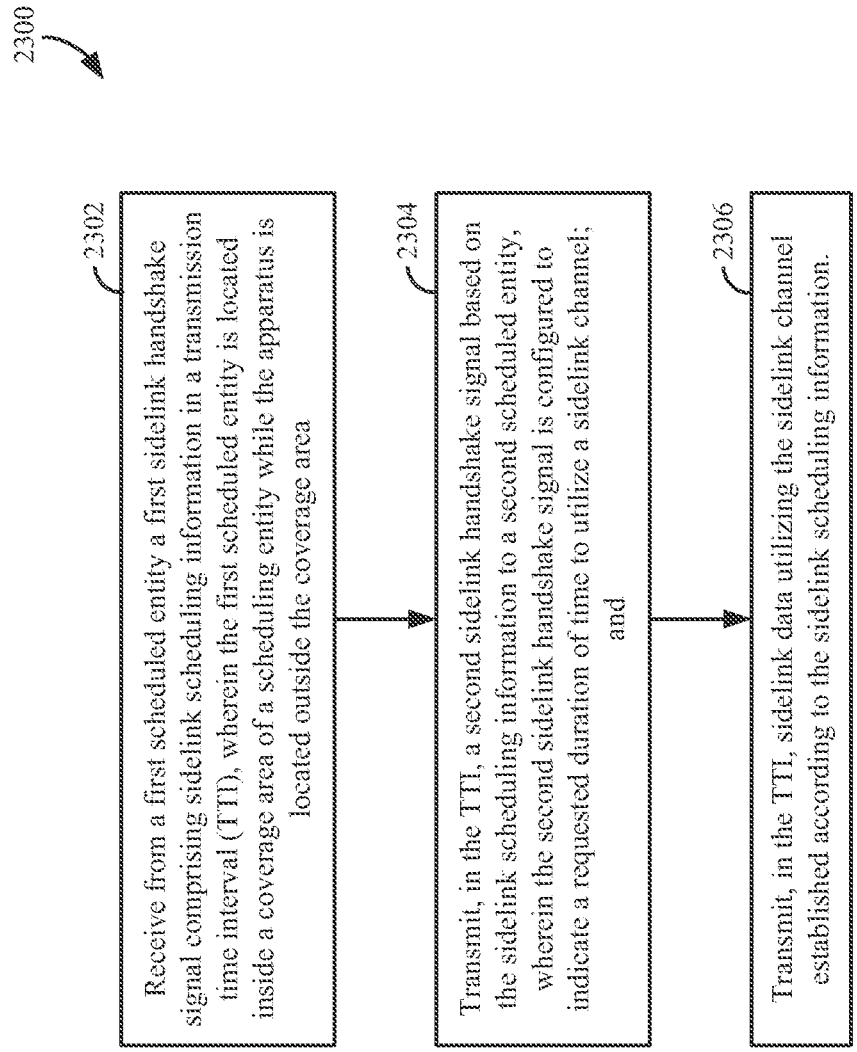
FIG. 23 is a flowchart illustrating a method of receiving sidelink grant information at an OoC sidelink device according to some aspects of the present disclosure.

FIG. 23 is a flowchart illustrating a method 2300 of receiving sidelink grant information at an OoC apparatus according to some aspects of the present disclosure. The method of FIG. 23 may be implemented or executed using any of the scheduled entities 204 or UEs for example as described in relation to FIGS. 1, 2, 4, 14-16, 18, 19, and 21. At block 2302, an apparatus may utilize the communication circuit 440 to receive at a location outside a coverage area of a scheduling entity, from a first scheduled entity, a first sidelink handshake signal containing sidelink scheduling information in a TTI, wherein the first scheduled entity is located inside the coverage area. For example, the first scheduled entity may be UE$_B$ of FIG. 16 or UE$_A$ of FIG. 18, and the OoC apparatus may be UE$_A$ of FIG. 16 or UE$_C$/UE$_D$ of FIG. 18. The first sidelink handshake signal may be a DSS (e.g., DSS 704 of FIG. 7) that includes sidelink scheduling information (e.g., sidelink grant information).

At block 2304, the apparatus may utilize the communication circuit to transmit, in the TTI, a second sidelink handshake signal based on the sidelink scheduling information to a second scheduled entity, wherein the second sidelink handshake signal is configured to indicate a requested duration of time to utilize a sidelink channel. For example, the second sidelink handshake signal may be a DSS/STS (e.g., DSS 704 or STS 706 of FIG. 7). Then, the apparatus may establish a sidelink with the second scheduled entity as described in detail above.

At block 2306, the apparatus may utilize the communication circuit to transmit, in the TTI, sidelink data utilizing the sidelink channel established according to the sidelink scheduling information. In one example, the second scheduled entity may be the same as the first scheduled entity (e.g., $UE_A$ of FIG. 16). In other examples, the second scheduled entity may be different from the first scheduled entity. For instance, the first scheduled entity may be $UE_A$ of FIG. 18, and the second scheduled entity may be $UE_D$ of FIG. 18. The above described method 2300 of FIG. 23 enables an OoC scheduled entity to establish a sidelink channel with another sidelink device. The sidelink scheduling information may carry the same information as sidelink grant information from a scheduling entity (e.g., scheduling entity 1806 of FIG. 18). In other examples, the sidelink grant information may provide information on resources available for sidelink communication in general, and the sidelink scheduling information may provide more specific scheduling and timing information destined to a predetermined scheduled entity for a specific sidelink channel.

In some aspects of the disclosure, the apparatus may not receive the sidelink scheduling information in block 2302. Nevertheless, the apparatus may still transmit a sidelink handshake signal to the second scheduled entity to request a sidelink channel. In this case, it is assumed that the apparatus is aware of the TTI/subframe timing for communicating with the second scheduled entity. If the requested sidelink channel is available, the second scheduled entity may respond with a DRS so that sidelink communication may be established.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure. In each of these examples, when referring to a UE or scheduled entity 204, these actions may be carried out by the transceiver 410.

Although the examples described herein (e.g., with reference to FIG. 15) may describe certain features, operations, processes, methods, and/or aspects from the perspective of a scheduled entity 204 (e.g., UE), one of ordinary skill in the art will understand that corresponding features, operations, processes, methods, and/or aspects from the perspective of the scheduling entity 202 (e.g., base station, cell, and/or other network entity) are readily ascertainable and understood from the present disclosure and, therefore, would not deviate from the scope of the present disclosure.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as 5G New Radio (NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication by an apparatus, the method comprising:
   receiving sidelink grant information from a scheduling entity; and
   transmitting a direction selection signal (DSS) in a first transmission time interval (TTI) included in a subframe to one or more first scheduled entities located outside a coverage area of the scheduling entity, wherein the DSS comprises sidelink scheduling information based on the sidelink grant information;
   receiving after transmitting the DSS, a source transmit signal (STS) in the first TTI from an out-of-coverage (OoC) scheduled entity of the first scheduled entities, wherein the STS is configured to request a duration of time to keep a sidelink channel available; and
   transmitting, in the first TTI, a destination receive signal (DRS) to the OoC scheduled entity to indicate availability of the sidelink channel such that the sidelink channel is established between the apparatus and the OoC scheduled entity based on the sidelink grant information.

2. The method of claim 1, wherein the DSS is configured to indicate to the one or more first scheduled entities that the apparatus does not have priority access to the sidelink channel.

3. The method of claim 1, further comprising:
   receiving a timing feedback from the one or more first scheduled entities; and
   transmitting the sidelink scheduling information on the condition that the timing feedback is received.

4. The method of claim 1, wherein the sidelink scheduling information comprises sidelink specific grant information destined to one or more predetermined out-of-coverage (OoC) scheduled entities of the first scheduled entities.

5. The method of claim 4, wherein the sidelink specific grant information is configured to facilitate establishing a predetermined sidelink channel between two of the predetermined OoC scheduled entities.

6. The method of claim 1, further comprising:
   receiving a sidelink handshake signal in a second TTI from a second scheduled entity located outside the coverage area of the scheduling entity, without receiving a prior sidelink handshake signal from the second scheduled entity.

7. A method of wireless communication by an apparatus, the method comprising:
   receiving at a location outside a coverage area of a scheduling entity, from a first scheduled entity, a direction selection signal (DSS) comprising sidelink scheduling information in a transmission time interval (TTI) included in a subframe, wherein the first scheduled entity is located inside the coverage area, wherein the sidelink scheduling information is based on sidelink grant information originated from the scheduling entity;
   transmitting, in the TTI, a source transmit signal (STS) based on the sidelink scheduling information to a second scheduled entity, wherein the STS is configured to indicate a requested duration of time to utilize a sidelink channel; and
   receiving, in the TTI, a destination receive signal (DRS) from the second scheduled entity configured to indicate availability of the sidelink channel; and
   transmitting, in the TTI, sidelink data utilizing the sidelink channel established according to the sidelink scheduling information.

8. The method of claim 7, wherein the DSS is configured to indicate that the first scheduled entity does not have priority access to the sidelink channel.

9. The method of claim 7, wherein the second scheduled entity is a primary device of the sidelink channel.

10. The method of claim 7, wherein the second scheduled entity is the same as the first scheduled entity.

11. The method of claim 7, wherein the second scheduled entity is different from the first scheduled entity.

12. An apparatus for wireless communication, comprising:
    a communication interface;
    a memory stored with executable code; and
    a processor operatively coupled with the communication interface and memory,
    wherein the processor is configured by the executable code to:
    receive sidelink grant information from a scheduling entity; and
    transmit a direction selection signal (DSS) in a first transmission time interval (TTI) included in a subframe to one or more first scheduled entities located outside a coverage area of the scheduling entity, wherein the DSS comprises sidelink scheduling information based on the sidelink grant information;
    receive after transmitting the DSS, a source transmit signal (STS) in the first TTI from an out-of-coverage (OoC) scheduled entity of the first scheduled entities, wherein the STS is configured to request a duration of time to keep a sidelink channel available; and
    transmit, in the first TTI, a destination receive signal (DRS) to the OoC scheduled entity such that the sidelink channel is established between the apparatus and the OoC scheduled entity based on the sidelink grant information.

13. The apparatus of claim 12, wherein the DSS is configured to indicate to the one or more first scheduled entities that the apparatus does not have priority access to the sidelink channel.

14. The apparatus of claim 12, wherein the processor is further configured to:
    receive a timing feedback from the one or more first scheduled entities; and
    transmit the sidelink scheduling information on the condition that the timing feedback is received.

15. The apparatus of claim 12, wherein the sidelink scheduling information comprises sidelink specific grant information destined to one or more predetermined out-of-coverage (OoC) scheduled entities of the first scheduled entities.

16. The apparatus of claim 15, wherein the sidelink specific grant information is configured to facilitate establishing a predetermined sidelink channel between two of the predetermined OoC scheduled entities.

17. The apparatus of claim 12, wherein the processor is further configured to:

receive a sidelink handshake signal in a second TTI from a second scheduled entity located outside the coverage area of the scheduling entity, without receiving a prior sidelink handshake signal from the second scheduled entity.

18. An apparatus for wireless communication, comprising:
 a communication interface;
 a memory stored with executable code; and
 a processor operatively coupled with the communication interface and memory,
 wherein the processor is configured by the executable code to:
 receive at a location outside a coverage area of a scheduling entity, from a first scheduled entity, a direction selection signal (DSS) comprising sidelink scheduling information in a transmission time interval (TTI) included in a subframe, wherein the first scheduled entity is located inside the coverage area, wherein the sidelink scheduling information is based on sidelink grant information originated from the scheduling entity;
 transmit, in the TTI, a source transmit signal (STS) based on the sidelink scheduling information to a second scheduled entity, wherein the STS is configured to indicate a requested duration of time to utilize a sidelink channel;
 receive, in the TTI, a destination receive signal (DRS) from the second scheduled entity configured to indicate availability of the sidelink channel; and
 transmit, in the TTI, sidelink data utilizing the sidelink channel established according to the sidelink scheduling information.

19. The apparatus of claim 18, wherein the DSS is configured to indicate that the first scheduled entity does not have priority access to the sidelink channel.

20. The apparatus of claim 18, wherein the second scheduled entity is a primary device of the sidelink channel.

21. The apparatus of claim 18, wherein the second scheduled entity is the same as the first scheduled entity.

22. The apparatus of claim 18, wherein the second scheduled entity is different from the first scheduled entity.

* * * * *